(12) United States Patent
Idriss et al.

(10) Patent No.: US 9,744,523 B2
(45) Date of Patent: Aug. 29, 2017

(54) HYDROGEN PRODUCTION FROM WATER BY TUNING THE PHOTONIC BAND GAP WITH THE ELECTRONIC BAND GAP OF A PHOTOACTIVE MATERIAL

(71) Applicant: SABIC Global Technologies B.V., Amsterdam (NL)

(72) Inventors: Hicham Idriss, Riyadh (SA); Ahmed Khaja Wahab, Riyadh (SA); Maher Al-Oufi, Riyadh (SA); Geoff Waterhouse, Auckland (NZ)

(73) Assignee: SABIC Global Technologies B.V., Amsterdam (NL)

( * ) Notice: Subject to any disclaimer, the term of this patent is extended or adjusted under 35 U.S.C. 154(b) by 70 days.

(21) Appl. No.: 14/502,724

(22) Filed: Sep. 30, 2014

(65) Prior Publication Data
US 2015/0090937 A1 Apr. 2, 2015

Related U.S. Application Data

(60) Provisional application No. 61/885,804, filed on Oct. 2, 2013.

(51) Int. Cl.
| | |
|---|---|
| *B01J 21/06* | (2006.01) |
| *B01J 23/52* | (2006.01) |
| *C01B 3/04* | (2006.01) |
| *B01J 37/16* | (2006.01) |
| *B01J 23/38* | (2006.01) |
| *B01J 35/00* | (2006.01) |
| *C25B 1/00* | (2006.01) |
| *B01J 37/02* | (2006.01) |
| *B01J 35/10* | (2006.01) |

(Continued)

(52) U.S. Cl.
CPC ............ *B01J 23/52* (2013.01); *B01J 21/063* (2013.01); *B01J 23/38* (2013.01); *B01J 35/004* (2013.01); *B01J 35/006* (2013.01); *B01J 35/0013* (2013.01); *B01J 35/1014* (2013.01); *B01J 37/0211* (2013.01); *B01J 37/0242* (2013.01); *B01J 37/16* (2013.01); *C01B 3/042* (2013.01); *C01B 13/0207* (2013.01); *C25B 1/003* (2013.01); *B01J 23/40* (2013.01); *B01J 23/66* (2013.01); *Y02E 60/364* (2013.01); *Y10T 428/2991* (2015.01)

(58) Field of Classification Search
CPC .......... B01J 21/063; B01J 23/40; B01J 23/66
USPC ......... 423/610; 502/350, 339, 344, 347, 325
See application file for complete search history.

(56) References Cited

FOREIGN PATENT DOCUMENTS

| | | |
|---|---|---|
| CN | 102336434 A | 2/2012 |
| EP | 2 703 078 | 3/2014 |

(Continued)

OTHER PUBLICATIONS

James, et al. "Technoeconomic Analysis of Photoelectrochemical (PEC) Hydrogen Production." Direct Technologies under the Department of Energy (DOE). DOE Contract No. GS 10F-009J, 2009.

(Continued)

*Primary Examiner* — Matthew E Hoban
*Assistant Examiner* — James Fiorito
(74) *Attorney, Agent, or Firm* — Norton Rose Fulbright US LLP

(57) ABSTRACT

Disclosed is a photocatalyst, and methods for its use, that includes a photoactive material comprising a photonic band gap and an electronic band gap, wherein the photonic band (Continued)

gap at least partially overlaps with the electronic band gap, and an electrically conductive material deposited on the photoactive material.

20 Claims, 13 Drawing Sheets

(51) Int. Cl.
    *C01B 13/02*     (2006.01)
    *B01J 23/66*     (2006.01)
    *B01J 23/40*     (2006.01)

(56) References Cited

FOREIGN PATENT DOCUMENTS

WO    WO 2013/159892    10/2013
WO    WO 2013/159894    10/2013

OTHER PUBLICATIONS

Bashir, et al. "Synergism and photocatalytic water splitting to hydrogen over Pt/TiO$_2$ catalysts: Effect particle size." Catalysis Today. 240:242-247, 2015. DOI: 10.1016/j.cattod.2014.05.034.
Chen, et al. "Increasing Solar Absorption for Photocatalysis with Black Hydrogenated Titanium Dioxide Nanocrystals ." Science, 331:746-750, 2011.
Chueh, et al. "High-Flux Solar-Driven Thermochemical Dissociation of CO2 and H20 Using Nonstoichiometric Ceria." Science. 330:1797-1801, 2010.
Cushing, et al. "Photocatalytic Activity Enhanced by Plasmonic Resonant Energy Transfer from Metal to Semiconductor." J. Am. Chem. Soc. 134(36):15033-15041, 2012.
Du, et al. "Plasmon-Induced Charge Separation and Recombination Dynamics in Gold-TiO$_2$ Nanoparticle Systems: Dependence on TiO$_2$ Particle Size." J. Phys. Chem. C. 113(16):6454-6462, 2009.
Frame, et al. "Photocatalytic Water Oxidation with Nonsensitized IrO2 Nanocrystals under Visible and UV Light." J. Am. Chem. Soc. 133(19):7264-7, 2011.
Fujishima & Honda. "Electrochemical Photolysis of Water at a Semiconductor Electrode." Nature. 238(5358):37-38, 1972.
Hanna & Nozik. "Solar conversion efficiency of photovoltaic and photoelectrolysis cells with carrier multiplication absorbers." J. Appl. Phys. 100:074510-074517, 2006.
Hou, et al. "Bioinspired molecular co-catalysts bonded to a silicon photocathode for solar hydrogen evolution." Nature Materials. 10(6):434-438, 2011.
Jaramillo, et al. "Identification of Active Edge Sites for Electrochemical H$_2$ Evolution from MoS$_2$ Nanocatalysts," Science. 317: 100-103, 2007.
Jayaweera, et al. "Photoreaction of Ethanol on TiO$_2$(110) Single-Crystal Surface." J. Phys. Chem. 111:1764-1769, 2007.
Kudo & Miseki, "Heterogeneous photocatalyst materials for water splitting." Chem. Soc. Rev. 38:253-278, 2009.
Linic, et al., Nature Materials. "Plasmonic-metal nanostructures for efficient conversion of solar to chemical energy." 10:911-921, 2011.
Link & El-Sayed. "Shape and size dependence of radiative, non-radiative and photothermal properties of gold nanocrystals." Int. Reviews in Physical Chemistry, 2000, vol. 19, No. 3, 409-453.
Lu, et al. "Integrating Plasmonic Nanoparticles with TiO$_2$ Photonic Crystal for Enhancement of Visible-Light-Driven Photocatalysis," Environ. Sci. & Technol. 46(2):1724-1730, 2012.
Maeda, et al. "Simultaneous photodeposition of rhodium-chromium nanoparticles on a semiconductor powder: structural characterization and application to photocatalytic overall water splitting." Energy Environ. Sci. 3:470-477, 2010.
Müller, et al. "Particle Size and Surface Chemistry in Photoelectrochemical Reactions at Semiconductor Particles." J. Phys. Chem. B 101(14):2501-2507, 1997.

Muggli & Falconer. "Parallel Pathways for Photocatalytic Decomposition of Acetic Acid on TiO$_2$." J. Catal. 187(1):230-237, 1999.
Murdoch, et al. "The effect of gold loading and particle size on photocatalytic hydrogen production from ethanol over Au/TiO$_2$ nanoparticles," Nature Chemistry. 3:489-492, 2011.
Nadeem, et al, "Photoreaction of ethanol on Au/TiO$_2$ anatase: Comparing the micro to nanoparticle size activities of the support for hydrogen production." J. PhotoChem & PhotoBio A: Chemicals. 216(2-3):250-255, 2010.
Ogden & Williams. "Electrolytic hydrogen from thin-film solar cells." Int. J. Hydrogen Energy. 15(3):155-169, 1990.
Ogisu, et al. "Lanthanum-Indium Oxysulfide as a Visible Light Driven Photocatalyst for Water Splitting." Chem. Lett. 36(7):854-855, 2007.
Sabio, et al. "Charge Separation in a Niobate Nanosheet Photocatalyst Studied with Photochemical Labeling." Langmuir. 26(10):7254-7261, 2010.
Sartorel, et al. "Shaping the beating heart of artificial photosynthesis: oxygenic metal oxide nano-clusters." Energy Environ. Sci. 5:5592-5603, 2012.
Seh, et. al. "Janus Au—TiO$_2$ Photocatalysts with Strong Localization of Plasmonic Near-Fields for Efficient Visible-Light Hydrogen Generation." Adv. Mater. 24(17):2310-2314, 2012.
Wilson & Idriss. "Structure Sensitivity and Photocatalytic Reactions of Semiconductors. Effect of the Last Layer Atomic Arrangement." J. Am. Chem. Soc. 124(38):11284-11285, 2002.
Wilson & Idriss. "Effect of surface reconstruction of TiO$_2$(001) single crystal on the photoreaction of acetic acid," J. Catal. 214(1):46-52, 2003.
Yablonovitch. "Inhibited Spontaneous Emission in Solid-State Physics and Electronics." Phys. Rev. Lett. 58(20):2059-2062, 1987.
Yamada, et al, "Photocarrier recombination dynamics in highly excited SrTiO$_3$ studied by transient absorption and photoluminescence spectroscopy." Appl. Phys. Lett. 95(12):121112-121112-3, 2009.
Zhang, et al. "Plasmonic Gold Nanocrystais Coupled with Photonic Crystal Seamlessly on TiO$_2$ Nanotube Photoelectrodes for Efficient Visible Light Photoelectrochemical Water Splitting." Nano. Lett. 13(1):14-20, 2013.
Zhou, et al. "Flow-Controlled Vertical Deposition Method for the Fabrication of Photonic Crystals." Langmuir. 20:1524-1526, 2004.
Zhou, et al. "Opal and Inverse Opal Fabricated with a Flow-Controlled Vertical Deposition Method." Langmuir. 21:4717-4723, 2005.
Barakat et al. "Effect of Cobalt Doping on the Phase Transformation of TiO2 Nanoparticles" Journal of Nanosci. Nanotechnol. 10:1-7, 2005.
Connelly et al. "The Photoreaction of TiO2 and Au/TiO2 Single Crystal and Powder Surfaces with Organic Adsorbates. Emphasis on Hydrogen Production from Renewables" Green Chemistry 14:260-281, 2012.
Connelly et al. "Photoreaction of Au/TiO2 for Hydrogen Production from Renewables: A review of the Synergistic effect Between Anatase and Rutile Phases of TiO2" Mater. Renewable Sustainable Energy 1:1-12, 2012.
Kodama et al. "Thermochemical Cycles for High-Temperature Solar Hydrogen Production" Chem. Rev. 107:4048, 2007.
Maeda et al. "Photocatalyst Releasing Hydrogen from Water" Nature 440:295, 2006.
Nadeem et al. "The Photoreaction of TiO2 and Au/TiO2 Single Crystal and Powder with Organic Adsorbates" Int. J. Nanotechnology 9:121, 2012.
Scholl et al. "Quantum Plasmon Resonances of Individual Metallic Nanoparticles" Nature 483:421-28, 2012.
Yazid et al. "Synthesis and Characterization of Gold Nanoparticles Supported on Zinc Oxide via the Deposition-Precipitation Method" Turk J Chem 34:639-50, 2010.
Kundu et al. "An Overview of Cathode Material and Catalysts Suitable for Generating Hydrogen in Micorbial Electrolysis Cell" Intl Journal of Hydrogen Energy 38:1745-1757 2013.
Stojic et al. "Intermetallics as Advanced Cathode Materials in hydrogen Production via Electrolysis" Intl. Journal of Hydrogen Energy. 31:841-816, 2006.

(56) References Cited

OTHER PUBLICATIONS

Xu, et al. "Photocatalytic Activity of Bulk TiO2 Anatase and Rutile Single Crystals Using Infrared Absorption Spectroscopy" Physics Review Letters 106:138302-4, 2011.
Hanaor et al. "Review of the Anatase to Rutile Phase Transformation" J. Material Science 46:855-874, 2011.
Zhao et al., "Facile Synthesis of Ag Nanoparticles Supported on TiO2 inverse Opal with Enhanced Visible-light Photocatalytic Activity" Thin Solid Films 520:3515-3522, 2012.
Kim et al. "Optimization of Visible Light Photocatalytic Water Splitting: Gold-Coated and Surface Textured TiO2 Inverse Opal Nano-Networks" Nanoscale 5:6254-60, 2013.
Mizukoshi, et al "Dependence of Photocatalitic Activities Upon the Structures of Au/Pd Bimetallic Nanoparticles Immobilized on TiO2 Surface" Applied Catalysis B:Enviromental 94:248-53, 2010.
International Search Report issued in PCT/IB2014/064973 dated Dec. 18, 2014.
Office Action for CN201480061146.5, dated Mar. 22, 2017.
Rosseler et al., *Journal of Catalysis* 269, 179-190 (2010).

HYDROGEN PRODUCTION FROM WATER BY TUNING THE PHOTONIC BAND GAP WITH THE ELECTRONIC BAND GAP OF A PHOTOACTIVE MATERIAL

CROSS REFERENCE TO RELATED APPLICATIONS

This application claims the benefit of U.S. Provisional Application No. 61/885,804, filed Oct. 2, 2013. The contents of the referenced application are incorporated into the present application by reference.

BACKGROUND OF THE INVENTION

A. Field of the Invention

The invention generally concerns photocatalysts that can be used to produce hydrogen from water in a photocatalytic reaction. The photocatalysts include a photoactive material that is capable of absorbing light, which can then excite an electron from the valence band (VB) to the conductive band (CB) and use the excited electron to split water and produce hydrogen. The photoactive material includes a photonic band gap (PBG) that is tuned with or partially overlaps with its electronic band gap (EBG), thereby reducing the likelihood of the excited electron reverting back to its non-excited or ground state and therefore increasing its photocatalytic activity.

B. Description of Related Art

Hydrogen production from water offers enormous potential benefits for the energy sector, the environment, and the chemical industry. While methods currently exist for producing hydrogen from water, many of these methods can be costly, inefficient, or unstable. For instance, photoelectrochemical (PEC) water splitting requires an external bias or voltage and a costly electrode (e.g., Pt-based) for electrolysis of water.

With respect to photocatalytic electrolysis of water from light sources, while many advances have been achieved in this area, most materials are either unstable under realistic water splitting conditions or require considerable amounts of other components (e.g., large amounts of sacrificial hole or electron scavengers) to work, thereby offsetting any gained benefits. By way of example, a semiconductor photocatalyst is a material that can be excited upon receiving energy equal to or higher than its electronic band gap. Upon photo-excitation electrons are transferred from the valence band (VB) to the conduction band (CB) resulting in the formation of an electron (in the CB) and a hole (in the VB). In the case of water splitting, electrons in the CB reduce hydrogen ions to $H_2$ and holes in the VB oxidize oxygen ions to $O_2$. One of the main limitations of most photocatalysts is the fast electron-hole recombination; a process that occurs at the nanosecond scale, while the oxidation-reduction reactions are much slower (microsecond time scale). Over 90% of photo-excited electron-hole pairs disappear before reaction by radiative and non-radiative decay mechanisms (Yamada, et al., 2009).

SUMMARY OF THE INVENTION

A solution to the aforementioned inefficiencies surrounding current water-splitting photocatalysts has been discovered. In particular, the solution resides in using electrically conductive materials (e.g., metal) in combination with a photoactive material that has a photonic band gap (e.g., an inverse opal structure or photonic crystal) that is tuned with or at least partially overlaps with its electronic band gap. Without wishing to be bound by theory, it is believed that overlapping of the photonic band gap with the electronic band gap reduces the likelihood that an excited electron would spontaneously revert back to its non-excited state (i.e., the electron-hole recombination rate can be reduced or suppressed). In particular, the photonic band gap of the photoactive material is believed to be a frequency range in which photons are unable to travel through the material. Therefore, when an electron moves from a given VB to a given CB (e.g., excitation through absorption of light), the electron will be restrained from spontaneously moving back to the VB, as the spontaneous emission of a photon that is typically associated with such a move from the CB to the VB would be at a frequency that is restricted due to the material's photonic band gap. The electron will remain in the CB for a longer period of time, which can result in use of said electron to split water rather than moving back to its VB (i.e., the electron-hole pair remains in existence for a longer period of time). This, coupled with the electrically conductive material deposited on the photoactive material, provides for a more efficient use of the excited electrons in water-splitting applications. Further, this improved efficiency allows for a reduced reliance on additional materials such as sacrificial agents as well as electrically conductive materials, thereby decreasing the complexity and costs associated with photocatalytic water-splitting systems.

A further discovery in the context of the present invention, with titanium dioxide being used as the photoactive material, is that the combination of anatase and rutile phases of titanium dioxide can further improve the efficiency of the photocatalysts of the present invention. In particular, it was discovered that the photonic band gap/electronic band gap overlap in combination with a mixture of anatase phase and rutile phase titanium dioxide can result in an increase in hydrogen production yield from water. Preferably, the titanium dioxide includes at least 80 wt. % anatase phase, and most preferably about 82.8 wt. % to about 90.2 wt. % anatase phase and 17.2 wt. % to about 9.8 wt. % rutile phase.

In one aspect of the present invention there is a photocatalyst that includes a photoactive material comprising a photonic band gap and an electronic band gap, wherein the photonic band gap that is tuned with or at least partially overlaps with the electronic band gap; and an electrically conductive material deposited on the photoactive material (e.g., it can be deposited on at least part of the surface of the photoactive material). "Tuned with" or "coincides with" means the photonic band gap range is identical with or substantially identical with (e.g., 95% or more) the electronic band gap range (e.g., 95% or more the same). "Partially overlaps with" means that at least a portion of the photonic band gap range overlaps with the electronic band gap range or is broader and completely encompasses the electronic band gap range. In particular aspects, the photoactive material has a three-dimensional structure, such as an inverse opal or photonic crystal structure. The inverse opal structure can be a closed-cell or open-cell structure. The photo-active material is such that it includes an electronic band gap where irradiation with light can excite an electron from its valence band to its corresponding conductive band. Non-limiting examples of such materials include semiconductive materials such as $TiO_2$, $ZnO$, $CeO_2$, $ZrO_2$, $SrTiO_3$, $CaTiO_3$, and $BaTiO_3$, or mixtures thereof (e.g., composite semiconductors such as $TiO_2/CeO_2$, $TiO_2/ZrO_2$). In particular instances, the photoactive material includes titanium dioxide such as titanium dioxide anatase, rutile, brookite or mixtures thereof such as anatase-rutile, anatase-brookite, or brookite-rutile, with a mixture of anatase phase to rutile phase being preferred. In one instance, the photoactive material comprises at least 80 wt. % anatase phase. In a particular embodiment, the photoactive material comprises about 82.8 wt. % to about 90.2 wt. % anatase phase and 17.2 wt. % to about 9.8 wt. % rutile phase. In certain instances, the photonic band gap ranges from 350 nm to 580 nm and the electronic band gap ranges from 360 to 430 nm. The electrically conductive material can be any material that conducts electricity in an efficient manner such as metal or non-metals (carbonaceous materials such as carbon nanostructures). In particular instances, the conductive material is a metal such as gold, ruthenium, rhenium, rhodium, palladium, silver, osmium, iridium, platinum, or combinations thereof. One particular combination that was identified as being particularly efficient in water-splitting applications is gold and palladium. The gold/palladium combination can be such that nanoparticles of palladium are deposited on the support as well as on the nanoparticles of gold. The electrically conductive material deposited on the photoactive material can be a plurality of nanostructures such as nanoparticles. The average size of such nanoparticles can be from 1 to 100 nm or from 1 to 50 nm or from 1 to 25 nm or from 1 to 10 nm. The amount of conductive material that can be deposited onto the photoactive material can vary as desired. In particular embodiments, it was found that low amounts of conductive materials can be used and still efficiently split water and create hydrogen gas. Such amounts can be less than 5, 4, 3, 2, 1 wt. % or less of the total weight of the photocatalyst. In some instances, the amount can be 0.001 wt. % to 5, 4, 3, 2, or 1 wt. % or from 0.001 wt. % to 0.1 wt. %. Also, the conductive material can cover from about 0.001 to 5% of the total surface area of the photoactive material and still efficiently produce hydrogen from water. The photocatalyst can be in particulate or powdered form and can be added to water. With a light source, the water can be split and hydrogen and oxygen gas formation can occur. In particular instances, a sacrificial agent can also be added to the water so as to further prevent electron/hole recombination. Notably, the efficiency of the photocatalyst of the present invention allows for one to avoid using or to use substantially low amounts of sacrificial agent when compared to known systems. In one instance, 0.1 to 5 vol. % of the photocatalyst and/or 0.1 to 5 g/L % of the sacrificial agent can be added to water. Non-limiting examples of sacrificial agents that can be used include methanol, ethanol, ethylene glycol propanol, iso-propanol, n-butanol, iso-butanol, ethylene glycol, propylene glycol, glycerol, or oxalic acid, or any combination thereof. In particular aspects, ethanol is used or ethylene glycol is used or a combination thereof. The photocatalyst can be self-supported (i.e., it is not supported by a substrate) or it can be supported by a substrate (e.g., glass, polymer beads, metal oxides, etc.). As noted above, the photocatalysts of the present invention are capable of splitting water in combination of a light source. No external bias or voltage is needed to efficiently split said water. In one non-limiting embodiment, the photocatalyst is capable of producing hydrogen gas from water at a rate of $1 \times 10^{-3}$ to $1 \times 10^{-7}$ mol/$g_{Catal}$ min.

Also disclosed is a system for producing hydrogen gas and/or oxygen gas from water. The system can include a container (e.g., transparent or translucent containers or opaque containers such as those that can magnify light (e.g., opaque container having a pinhole(s)) and a composition that includes photocatalyst of the present invention, water, and optionally a sacrificial agent. The container in particular embodiments is transparent or translucent. The system can also include a light source for irradiating the composition. The light source can be natural sunlight or can be from a non-natural source such as a UV lamp. As noted above, the system does not have to include an external bias or voltage.

In another embodiment, there is disclosed a method for producing hydrogen gas and/or oxygen gas from water, the method comprising using the aforementioned system and subjecting the composition to the light source for a sufficient period of time to produce hydrogen gas and/or oxygen gas from the water. The hydrogen gas and/or oxygen gas can then be captured and used in other down-stream processes such as for ammonia synthesis (from $N_2$ and $H_2$), for methanol synthesis (from CO and $H_2$), for light olefins synthesis (from CO and $H_2$), or other chemical production processes that utilize $H_2$ etc. In one non-limiting aspect, the method can be practiced such that the hydrogen production rate from water is $1 \times 10^{-3}$ to $1 \times 10^{-7}$ mol/$g_{Catal}$ min with a light source having a flux of about 0.1 mW/cm$^2$ and 30 mW/cm$^2$.

Also contemplated is a method of modifying existing photocatalysts that have a photonic band gap material by modifying the photonic band gap to coincide with or at least partially overlap with the electronic band gap of said material. The photonic band gap can be tuned or modified as needed by modifying the pore size of the photonic band gap material (e.g., inverse opal). In one aspect, increasing the pore size can result in an increase in the photonic band gap.

In a further aspect, there is disclosed a method for tuning the photonic band gap of the photoactive material of the present invention by re-orienting the orientation of the material with respect to the light source (or vice versa) such that the photonic band gap is tuned to coincide with or at least partially overlap with the electronic band gap of said material. Because the photonic band gap changes with both its packing structure and incident light angle it is poised to work with increased efficiency during day light (for example a (111) orientated material with macro-pore diameter D=200 nm has its photonic band gap decreasing from 450 nm to 360 nm with increasing the incident light angle from about 20° C. to 60° C.).

In yet another aspect of the present invention, embodiments 1 to 37 are disclosed. Embodiment 1 is a photocatalyst comprising: a photoactive material comprising a photonic band gap and an electronic band gap, wherein the photonic band gap at least partially overlaps with the electronic band gap; and an electrically conductive material deposited on the photoactive material. Embodiment 2 is the photocatalyst of embodiment 1, wherein the photoactive material has an inverse opal structure. Embodiment 3 is the photocatalyst of embodiment 2, wherein the photoactive material comprises titanium dioxide. Embodiment 4 is the photocatalyst of embodiment 3, wherein the titanium dioxide comprises a mixture of anatase and rutile. Embodiment 5 is the photocatalyst of embodiment 4, wherein the titanium dioxide comprises at least 80 wt. %. Embodiment 6 is the photocatalyst of embodiment 5, wherein the titanium dioxide comprises about 82.8 wt. % to 90.2 wt. % anatase and 17.2 wt. % to 9.8 wt. % rutile. Embodiment 7 is the photocatalyst of any one of embodiments 3 or 6, wherein the photonic band gap ranges from 350 nm to 420 nm and the electronic band gap ranges from 360 to 430 nm. Embodiment 8 is the photocatalyst of any one of embodiments 1 to 7, wherein the electrically conductive material comprises a metal. Embodiment 9 is the photocatalyst of embodiment 8, wherein the metal is gold, ruthenium, rhenium, rhodium, palladium, silver, osmium, iridium, platinum, or combinations thereof. Embodiment 10 is the photocatalyst of embodiment 9, wherein the metal is gold or palladium or a combination thereof. Embodiment 11 is the photocatalyst of embodiment 10, wherein the palladium is deposited on the photoactive material and on the gold. Embodiment 12 is the photocatalyst of any one of embodiments 1 to 11, wherein the photocatalyst is in particulate or powdered form. Embodiment 13 is the photocatalyst of any one of embodiments 1 to 12, wherein the electrically conductive material is a plurality of nanostructures such as nanoparticles. Embodiment 14 is the photocatalyst of embodiment 13, wherein the average particle size of the nanoparticles is from 1 to 10 nanometers. Embodiment 15 is the photocatalyst of any of embodiments 1 to 14, comprising 0.001 to 5 wt. % of the electrically conductive material. Embodiment 16 is the photocatalyst of any of embodiments 1 to 15, wherein the electrically conductive material covers between 0.001% to 5% of the total surface area of the photoactive material. Embodiment 17 is the photocatalyst of any of embodiments 1 to 16, wherein the photocatalyst is comprised in a composition that includes water. Embodiment 18 is the photocatalyst of embodiment 17, wherein the composition further comprises a sacrificial agent. Embodiment 19 is the photocatalyst of embodiment 18, wherein the sacrificial agent is methanol, ethanol, propanol, iso-propanol, n-butanol, iso-butanol, ethylene glycol, propylene glycol, glycerol, or oxalic acid, or any combination thereof. Embodiment 20 is the photocatalyst of embodiment 19, wherein the sacrificial agent is ethanol or ethylene glycol. Embodiment 21 is the photocatalyst of any one of embodiments 17 to 20, wherein the composition comprises 0.1 to 5 g/L of the photocatalyst and/or 0.1 to 5 vol. % of the sacrificial agent. Embodiment 22 is the photocatalyst of any one of embodiments 1 to 21, wherein the photocatalyst is self-supported. Embodiment 23 is the photocatalyst of any one of embodiments 1 to 21, wherein the photocatalyst is supported by a substrate such as glass, polymer beads, or metal oxides. Embodiment 24 is the photocatalyst of any one of embodiments 1 to 23, wherein the photocatalyst is capable of catalyzing the photocatalytic electrolysis of water. Embodiment 25 is the photocatalyst of embodiment 24, wherein the $H_2$ production rate from water is $1 \times 10^{-3}$ to $1 \times 10^{-7}$ mol/$g_{Catal}$ min. Embodiment 26 is a system for producing hydrogen gas and oxygen gas from water, the system comprising: (a) a transparent container comprising a composition that includes the photocatalyst of any one of embodiments 1 to 25, water, and a sacrificial agent; and (b) a light source for irradiating the composition. Embodiment 27 is the system of embodiment 26, wherein the light source is sunlight. Embodiment 28 is the system of embodiment 26, wherein the light source is an ultra-violet lamp. Embodiment 29 is the system of any one of embodiments 26 to 28, wherein an external bias is not used to produce the hydrogen gas and oxygen gas. Embodiment 30 is a method for producing hydrogen gas and oxygen gas from water, the method comprising obtaining a system of any one of embodiments 26 to 29 and subjecting the composition to the light source for a sufficient period of time to produce hydrogen gas and oxygen gas from the water. Embodiment 31 is the method of embodiment 30, wherein an external bias is not used to produce the hydrogen gas and oxygen gas. Embodiment 32 is the method of any one of embodiments 30 to 31, wherein the $H_2$ production rate from water is $1 \times 10^{-3}$ to $1 \times 10^{-7}$ mol/$g_{Catal}$ min. Embodiment 33 is the method of any one of embodiments 30 to 32, wherein the light source has a flux between about 0.1 mW/cm$^2$ and 30 mW/cm$^2$. Embodiment 34 is a method of preparing any one of the photocatalysts of embodiments 1 to 25 comprising obtaining the photoactive material and depositing the electrically conductive material on the photoactive material. Embodiment 35 is the method of embodiment 34, further comprising tuning the photoactive material such that the photonic band gap of said at least partially overlaps with the electronic band gap of said material. Embodiment 36 is the method of embodiment 35, wherein the structure of the photoactive material is an inverse opal. Embodiment 37 is the method of embodiment 36, wherein the photonic band gap of said material is tuned by modifying the diameter of the pore size of the inverse opal structure such that an increase in said pore size results in an increase in the photonic band gap of said material.

The following includes definitions of various terms and phrases used throughout this specification.

"Water splitting" or any variation of this phrase describes the chemical reaction in which water is separated into oxygen and hydrogen.

"Inhibiting," "preventing," or "reducing" or any variation of these terms, when used in the claims or the specification includes any measurable decrease or complete inhibition to achieve a desired result. By way of example, reducing the spontaneous emission of an excited electron encompasses a situation where a decrease in the amount of spontaneous emission occurs in the presence of a photocatalyst or photoactive material of the present invention when compared with a situation where, for example, a photoactive material is used that does not have its photonic band gap tuned with or at least partially overlapping with the material's electronic band gap.

"Effective" or any variation of this term, when used in the claims or specification, means adequate to accomplish a desired, expected, or intended result.

"Nanostructure" refers to an object or material in which at least one dimension of the object or material is equal to or less than 100 nm (e.g., one dimension is 1 to 100 nm in size). In a particular aspect, the nanostructure includes at least two dimensions that are equal to or less than 100 nm (e.g., a first dimension is 1 to 100 nm in size and a second dimension is 1 to 100 nm in size). In another aspect, the nanostructure includes three dimensions that are equal to or less than 100 nm (e.g., a first dimension is 1 to 100 nm in size, a second dimension is 1 to 100 nm in size, and a third dimension is 1 to 100 nm in size). The shape of the nanostructure can be of a wire, a particle, a sphere, a rod, a tetrapod, a hyper-branched structure, or mixtures thereof.

The term "about" or "approximately" are defined as being close to as understood by one of ordinary skill in the art, and in one non-limiting embodiment the terms are defined to be within 10%, preferably within 5%, more preferably within 1%, and most preferably within 0.5%.

The use of the word "a" or "an" when used in conjunction with the term "comprising" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The photoactive catalysts and photoactive materials of the present invention can "comprise," "consist essentially of," or "consist of" particular components, compositions, ingredients etc. disclosed throughout the specification. With respect to the transitional phase "consisting essentially of," in one non-limiting aspect, a basic and novel characteristic of the photoactive catalysts and materials of the present invention are their ability to efficiently use excited electrons in water-splitting applications to produce hydrogen.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description.

DETAILED DESCRIPTION OF THE INVENTION

Figure 1:
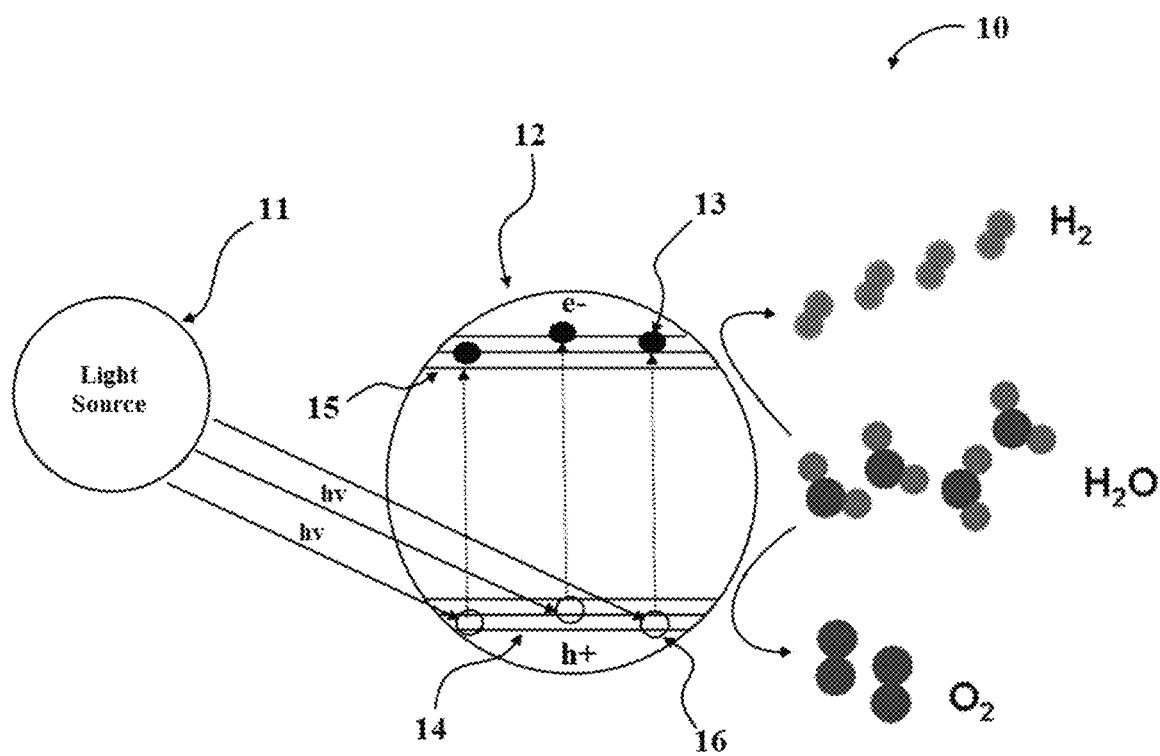
FIG. 1: Schematic diagram of a water splitting system of the present invention.

While hydrogen-based energy has been proposed by many as a solution to the current problems associated with carbon-based energy (e.g., limited amounts and fossil fuel emissions), the currently available technologies are either expensive, inefficient, or unstable. The present application provides a solution to these issues. The solution is predicated on the use of conductive material and a photoactive material that has a photonic band gap (e.g., structures such as inverse opals and photonic crystals) and an electronic band gap (e.g., semi-conductive materials) that are tuned with or overlap with one another, the result of which allows for efficient hydrogen production by splitting water via a light source such as sunlight or a UV lamp. In particular aspects, it was further discovered that a combination of gold and palladium as the conductive material resulted in a more efficient catalyst when compared with a system in which gold alone was used as the conductive material.

These and other non-limiting aspects of the present invention are discussed in further detail in the following sections.

A. Photoactive Catalysts

The photoactive catalysts of the present invention include a photoactive material and a conductive material deposited on at least a portion of the surface of the photoactive material.

With respect to the photoactive material, such material includes a photonic band gap (e.g., inverse opal structures, photonic crystals, etc.) and an electronic band gap (e.g., semi conductive materials). Materials have a photonic band gap are materials that can control the propagation of electromagnetic radiation by creating periodic dielectric structures. A photonic band gap material can prohibit the propagation of electromagnetic radiation within a specified frequency range (band) in certain directions. Stated another way, such materials can prevent light from propagating in certain directions with specified energies. This can be thought of as the complete reflection of electromagnetic radiation of a particular frequency directed at the material in at least one direction because of the particular structural arrangement of separate domains of the material, and refractive indices of those domains. The structural arrangement and refractive indices of the separate domains that make up such materials form photonic band gaps that inhibit the propagation of light centered around a particular frequency. There are one-, two-, and three-dimensional photonic band gap materials. One-dimension materials have structural and refractive periodicity in one direction. Two-dimensional materials have periodicity in two directions. Three-dimensional materials include periodicity in three directions.

In particular aspects of the present invention, three-dimensional photonic materials are used. One non-limiting aspect of preparing a three-dimensional photonic band gap material includes infiltration of a fluid, which may be a liquid or a gas, into a template solid having substantially continuous porosity throughout its extent. This is followed by solidifying the fluid and then removing the template solid. The resulting structure is formed such that its solid portion is substantially in the positions of the continuous porosity of the template solid and its pores are substantially in the positions of the solid members of the template solid. In more particular embodiments, the colloidal crystal template technique can be used, which includes the following general steps:

(a) Generally the utilization of colloidal crystal templating for the fabrication of inverse opal photonic crystals involves three main steps. Firstly the 3 dimensional synthetic opal is fabricated by the self-assembly of monodisperse colloidal polymer spheres (e.g., Monodisperse poly(methylmetacrylate) (PMMA) colloids) into an face centered cube (FCC) lattice. Along the FCC [111] plane a PBG should open in the opaline structure resulting in the reflection of a range of wavelengths (depending on the diameter of the sphere) across the electromagnetic spectrum. Second, a sol-gel of a dielectric material infiltrates the pore spacing in the colloidal crystal template. Subsequent hydrolysis and condensation reactions lead to the formation of a network solid. The solid semi-conductive material (e.g., $TiO_2$) formed can then be hydrated to an amorphous form and will have a higher overall refractive index than that of single crystals. Hence the material must be dried in air, after which time calcination is used to remove the colloidal crystal template. This leaves behind an inverse opal structure with a periodically modulated refractive index in 3-D; a macroporous FCC array of air spheres in a dielectric matrix.

(b) Two methods can be used to deposit conductive material on the surface of the colloid. The routes are differentiated at what stage the conductive material (e.g., gold) is added. In route 1, the conductive material solution (e.g., containing the desired % of metal ions (e.g., Au ions) from their precursor material (e.g., $HAuCl_4.3H_2O$ is prepared in advance, and added into the semi-conductive material (e.g., $TiO_2$) after formation of inverse opal structure (after the templates were removed). In route 2 the solid $HAuCl_4.3H_2O$ were weighted and added to the semi-conductive precursor solution before infiltration of the templates.

Calcination at 450° C. can be used to remove the PMMA template as well as to crystalize the semi-conductive material (e.g., $TiO_2$) and disperse the conductive material (e.g., gold nanoparticles) throughout the inverse opal structure. As shown in the data, calcination at 500° C. to 800° C. is preferable when $TiO_2$ is used, and more preferably 550° C. to 750° C., and most preferably between 600° C. to 700° C. In both routes, after the conductive material is added, the samples change color from slightly yellow to a distinct purple in the case of $Au$—$TiO_2$. This color change is due to the reduction of Au(III) to Au(0) and the purple color of gold nanoparticles is the result of surface plasmon resonance of gold, which can be affected by various parameters such as size of the particle, shape and the refractive index of media. Route 1 gave more evenly distributed color compared to the route 2, which means higher dispersion of gold on the surface of titania, and likely smaller Au particle size is achievable with route 1 which is beneficial for enhancement of photoactivity.

Figure 8:
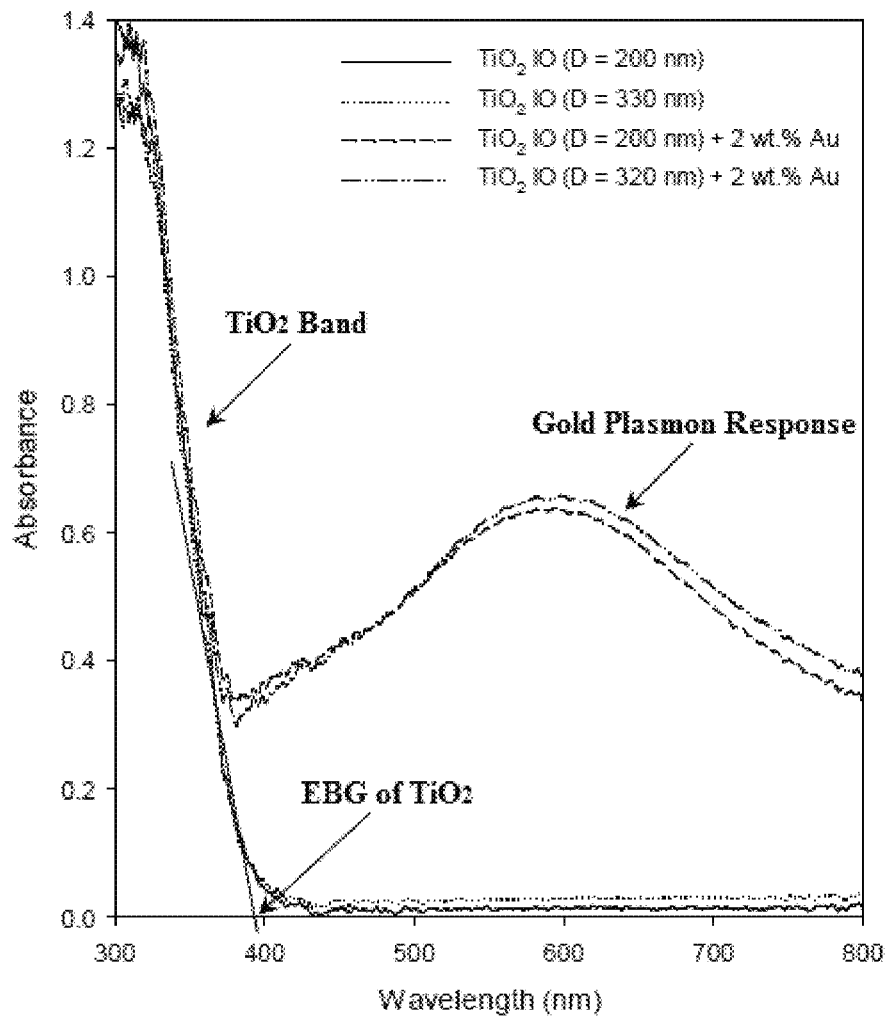
FIG. 8: UV-Vis absorbance spectra for TiO$_2$ inverse opal powders with macropore diameters of 200 nm and 320 nm in air. The spectra show strong absorption below 400 nm due to anatase TiO$_2$. PBGs are not seen in the spectra because the lattice planes are randomly oriented and the PBGs are broad due to the high refractive index of TiO$_2$. Deposition of gold nanoparticles on the TiO$_2$ supports gives rise to intends absorption bands at ~580 nm due to the gold surface plasmon resonance, which contributes to the high photo-catalytic activity of these samples under direct sunlight.

A material's electronic band gap can be extracted from its UV-Vis absorption spectra such as the given in FIG. 8 by extending the tangent of the curve to the x-axis (energy or wavelengths). For instance, and with reference to FIG. 8, it is seen that $TiO_2$ absorbs light with wavelength less than 400 nm, extrapolation of the tangent to the curve on the x-axis gives the wavelength (or energy) position at the edge of the band gap (approximately 390 nm or close to 3.1 eV).

A material's photonic band gap can be calculated by measuring the distance between two repeating microscopic unit cells (D) using the following formula:

$$m\lambda = 2d_{hkl}\sqrt{n_{avg}^2 - \sin^2\theta_{ext}} \quad \text{(equation 1)},$$

where m is the diffraction order, $\theta$ is the incident angle of light with respect to the surface normal, $d_{hkl}$ is $$d_{hkl} = \frac{\sqrt{2D}}{\sqrt{(h^2 + k^2 + l^2)}} \quad \text{(equation 2)}$$

where D is the macropore diameter and h, k, l are miller indices of the exposed planes, and $n_{avg}$ is the average refractive index of the photonic crystal ($n_{avg} = [\phi_{solid} n_{solid} + (1-\phi_{solid})n_{void}]$). The average refractive index of the three-dimensional structure (e.g., photonic crystal or inverse opal), and hence the PBG position, $\lambda$, depend on the refractive index of the medium filling the macropores in the structure.

By using these parameters, one can then tune the photonic band gap of a given material to be identical with, substantially identical with, or at least partially overlap with said material's electronic band gap. The photonic band gap of the material can be modified as needed by using the above equations. In particular, combining equations 1 and 2 one gets:

$$m\lambda = \frac{\sqrt{2D}}{\sqrt{(h^2+k^2+l^2)}}\sqrt{n_{avg}^2 - \sin^2\theta_{ext}}. \quad \text{(equation 3)}$$

For a first order diffraction m=1 and FCC close packed structure (111) and incident light perpendicular to the [111] plane ($\theta$=0) equation 3 is simplified to:

$$\lambda = \frac{2\sqrt{2}}{\sqrt{3}} D n_{avg}. \quad \text{(equation 4)}$$

In other words, increasing the macropore size (D) of the opal materials directly increases the photonic band gap ($\lambda$).

B. Uses of the Photocatalysts

Once the photocatalysts of the present invention are prepared and properly tuned, they can be used in water-splitting systems. FIG. 1 provides a non-limiting illustration of how such a system 10 could be used to split water to produce H$_2$ and O$_2$. A light source 11 (e.g., natural sunlight or UV lamp) contacts the photocatalytic material 12, thereby exciting electrons 13 from their valence band 14 to their conductive band 15, thereby leaving a corresponding hole 16. The electrons 13 are used to reduce hydrogen ions to form hydrogen gas, and the holes are used to oxidize oxygen ions to oxygen gas. The hydrogen gas and the oxygen gas can then be collected and used in down-stream processes. As explained elsewhere, due to the photonic band gap being tuned with or at least partially overlapping with the electronic band gap of the photocatalytic material 12, the electrons 13 can remain in the conductive band for a longer period of time when compared with a system in which the photonic band gap is not tuned with or does not at least partially overlap with the electronic band gap of said material 12.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Materials and Methods Used to Prepare, Test, and Characterize Photocatalysts

TiO$_2$ inverse opal powders with macro pore diameters (D) of 200 nm or 320 nm, and photonic band gaps along the [111] direction in air of 357 nm and 585 nm, respectively, were fabricated by the colloidal crystal template technique. Colloidal crystals composed of mono-disperse PMMA colloids (diameters 235 nm or 372 nm, respectively) were prepared using a flow-controlled vertical deposition method (Zhou, et al., 2005; Zhou, et al., 2004) to deposit a PMMA colloidal crystal film on a planar substrate and then infiltrated with a TiO$_2$ sol-gel precursor. Careful drying and calcination of the resulting TiO$_2$/PMMA (polymethylmethacrylate) composites selectively removed the PMMA template, yielding 3-dimensionally ordered macroporous TiO$_2$ inverse opals supports. Gold nanoparticles were subsequently deposited on the TiO$_2$ inverse opals supports using the deposition with urea method (Cushing, et al., 2012). The obtained photocatalysts, labeled Au/TiO$_2$ (PBG-357 nm) and Au/TiO$_2$ (PBG-585 nm), respectively, were then subjected to structural, chemical and photocatalytic characterization as outlined in the following Examples.

Photocatalytic tests were conducted under batch conditions. Typically 10-25 mg of catalyst was loaded into a 200 mL Pyrex reactor. Catalysts were reduced with H$_2$ for one hour at 300° C. prior to reaction; this was followed by purging with N$_2$ under continuous stirring until all hydrogen was removed. Water (60 mL) was added to the reactor and variable amounts of ethanol (from 0.1 mL to 5 mL). A ultra-violet (UV) lamp (Spectra-line-100 W) was used with a cut off filter of 360 nm and above. The UV flux at the front side of the reactor was between about 1-1.2 mW/cm$^2$. Sampling was conducted approximately every 30 minutes. For reactions conducted under sunlight, the same reactor was put under the sun and the UV flux was monitored (the values oscillated between 0.25 and 0.40 mW/cm$^2$ from 10 to 4 pm); catalyst were not stirred under direct sunlight excitation. Products were analyzed using GCs equipped with thermal conductivity detector TCD and Porapak packed column at 45° C. and with N$_2$ as the carrier gas. For O$_2$ detection a GC equipped with TCD was also used but with He as carrier gas.

Transmission electron microscopy studies were performed at 200 kV with a JEOL JEM 2010F instrument equipped with a field emission source. For each sample, more than 300 individual TiO$_2$ and Au nanoparticles were used for particle size determinations. Samples were dispersed in alcohol in an ultrasonic bath and a drop of supernatant suspension was poured onto a carbon coated copper TEM grid for analysis.

SEM images were taken using a Philips XL-30 field emission gun scanning electronmicroscope (FEGSEM). All micrographs were collected at an electron gun accelerating voltage of 5 kV. Specimens were mounted on black carbon tape and platinum sputter coated for analysis.

The XPS data were collected on a Kratos Axis UltraDLD equipped with a hemi-spherical electron energy analyzer. Spectra were excited using monochromatic Al Kα X-rays (1486.7 eV) with the X-ray source operating at 100 W. Survey scans were collected with a 160 eV pass energy, whilst core level Au4f scans were collected with a pass energy of 20 eV. The analysis chamber was at pressures in the $10^{-10}$ torr range throughout the data collection.

Photoluminescence was collected on a Perkin-Elmer LS-55 Luminescence Spectrometer. The excitation wavelength was set at 310 nm and spectra were recorded over a range of 330-600 nm using a standard photomultiplier. A 290 nm cut off filter was used during measurements.

UV-Visabsorbance spectra were taken over the range 250-900 nm on a Shimadzu UV-2101 PC spectrophotometer equipped with a diffuse reflectance attachment for powder samples.

UV-Visible reflectance spectra of the TiO$_2$ inverse opal thin films in air and water were collected using an Ocean Optics CCD S-2000 spectrometer fitted with a microscope objective lens coupled to a bifurcated fiber optic cable. A tungsten light source was focused on to the polypyrrole (PPy) films with a spot size of approximately 1-2 mm$^2$. Reflectivity data were recorded with a charge-coupled device CCD detector in the wavelength range of 300-900 nm. Sample illumination and reflected light detection were performed along the surface normal.

Example 2

Data

Figure 2:
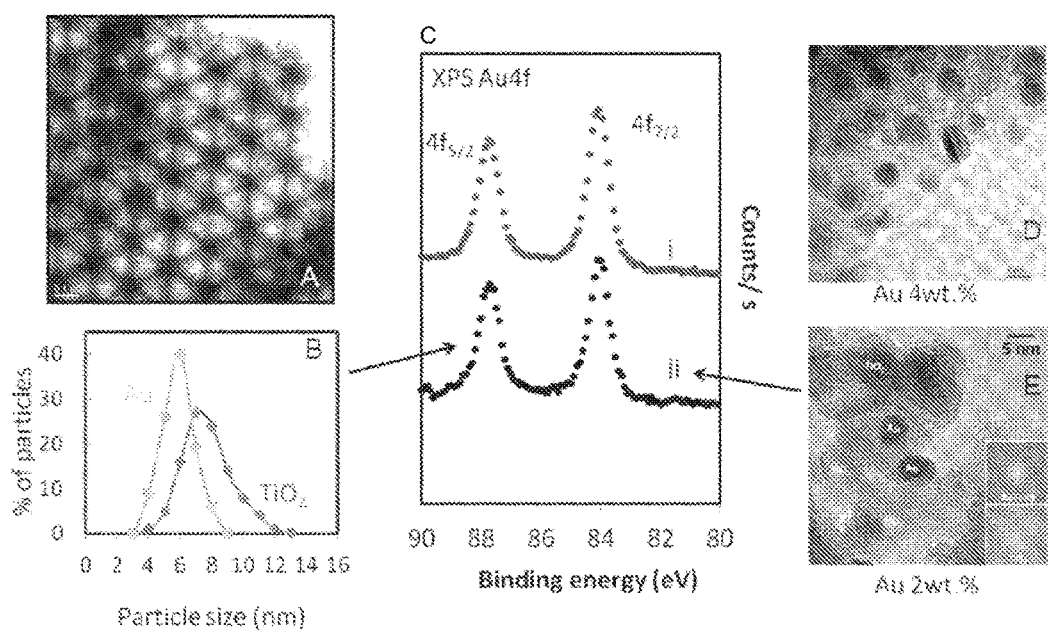
FIG. 2: (A) TEM of PBG Au/TiO$_2$ photocatalyst. (B) Particle size distribution of Au and TiO$_2$ particles in the PBG Au/TiO$_2$ photocatalyst. (C) XPS Au4f for two PBG Au/TiO$_2$ photo-catalysts (the atomic % of Au was 0.55 and 0.51 for PBG-585 nm (i) and PBG-357 nm (ii) respectively). (D) and (E) High Resolution TEM of 2 and 4 wt. % Au of the PBG Au/TiO$_2$ catalysts indicating the uniform distribution of Au particles at both loads of Au.
Figure 3:
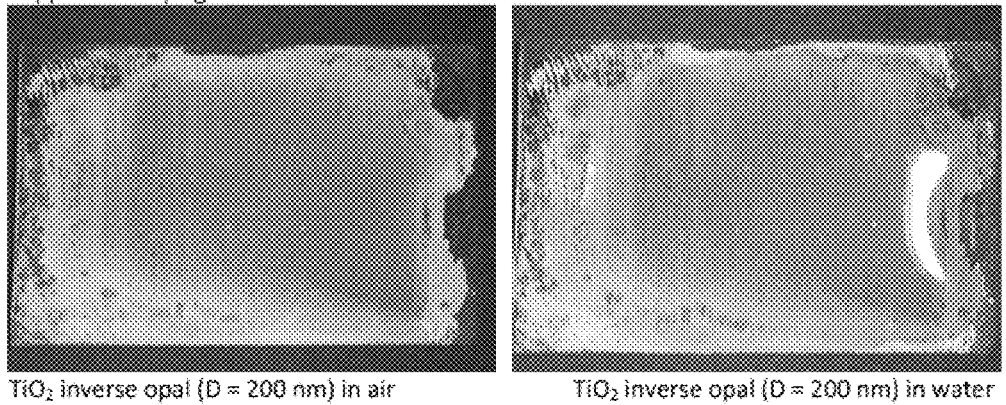
FIG. 3: UV-Vis reflectance spectra for a TiO$_2$ inverse opal with macropore diameter (D)=200 nm in air (n=1.00) and in water (n=1.34). The spectra were collected along the [111] direction of a TiO$_2$ inverse opal thin film. The PBG for Bragg diffraction on f.c.c. (111) planes is observed at 357 nm in air, and 450 nm in water. The shift in the PBG on immersion of the inverse opal in water results from an increase in the average refractive index of the photonic crystal when it is filled with water. The attenuation of the reflectance peak in water is due to increased scattering of light and a decrease in refractive index contrast between titania (n=2.1-2.3 for sol-gel derived anatase) and the medium filling the macropores.
Figure 3:
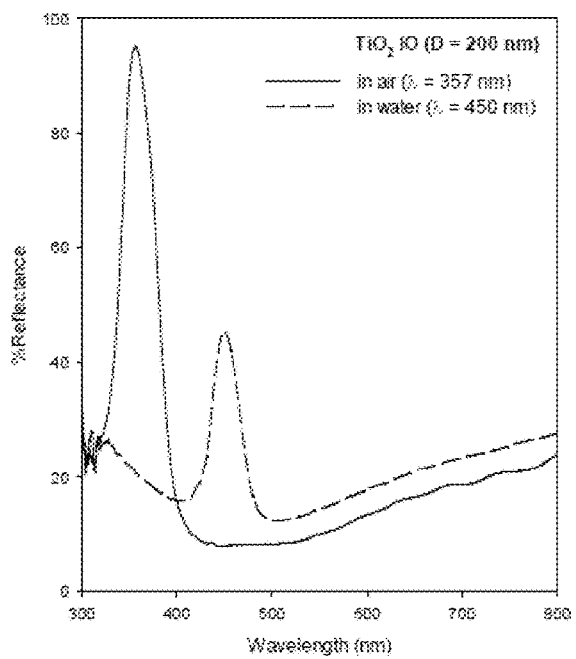
Figure 4:
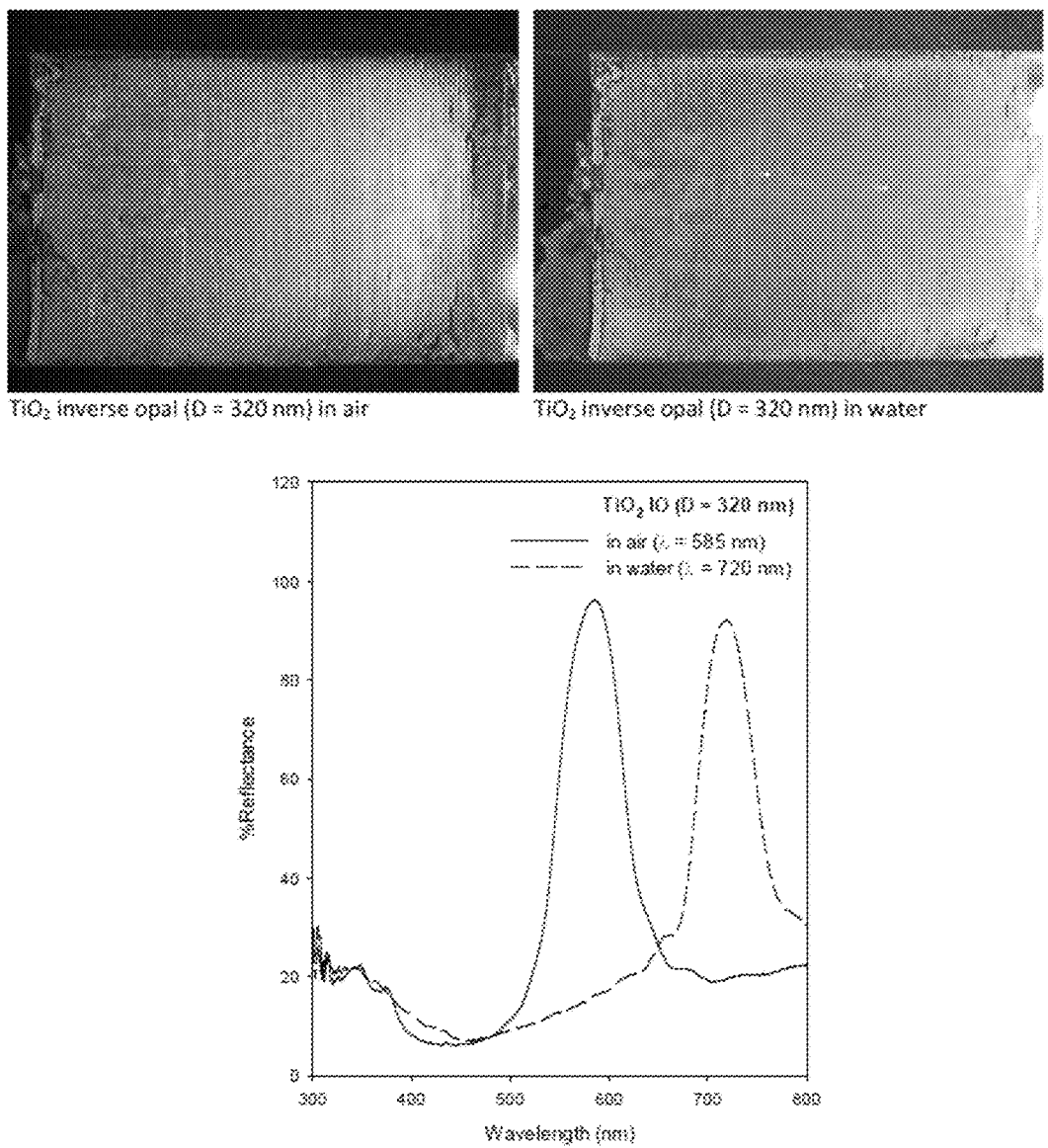
FIG. 4: UV-Vis reflectance spectra for a TiO$_2$ inverse opal with macropore diameter (D)=320 nm in air (n=1.00) and in water (n=1.34). The spectra were collected along the [111] direction of a TiO$_2$ inverse opal thin film. The PBG for Bragg diffraction on f.c.c. (111) planes is observed at 585 nm in air, and 721 nm in water. The shift in the PBG on immersion of the inverse opal in water results from an increase in the average refractive index of the photonic crystal when it is filled with water.

FIG. 2 presents transmission electron microscopy (TEM), high resolution TEM (HRTEM) and X-ray photo electron spectroscopy (XPS) of two PBG catalysts (PBG-357 nm and PBG-585 nm). The properties and composition of Au/TiO$_2$ catalysts, where the TiO$_2$ is present in the anatase form, are given. The 3-dimensionally ordered macroporous structure of the PBG materials is clearly seen in FIG. 2A, and the anatase TiO$_2$ crystallites (analyzed by X-ray diffraction (XRD)—not shown) and Au nanoparticles are seen in FIGS. 2D and E. The particle size distribution of both TiO$_2$ and Au are presented in FIG. 2B; both components (Au and TiO$_2$) are of comparable size with the Au particles smaller. Au4f XPS indicates that Au is present in its metallic form with no apparent charge donation from/to the semiconductor to the metal. The Au/TiO$_2$ (PBG-357 nm) and Au/TiO$_2$ (PBG-585 nm) catalysts prepared in this study are near identical in their chemical compositions as well as their main characteristics (particle sizes, Brunauer-Emmett-Teller (BET) surface area, 60 m$^2$/g, exposed area of Au, support phase and valence band electronic structure[14]) but differ in their macropore diameter and optical PBG properties. One has a PBG along the [111] direction of 357 nm (in air) whilst the other has its PBG along the [111] direction of 585 nm (in air), as determined from UV-Vis reflectance measurements on TiO$_2$ inverse opal thin films (FIG. 3 and FIG. 4). The PBG can be calculated from the distance between two repeating microscopic unit cells (D) using the following formula:

$$m\lambda = 2d_{hkl}\sqrt{n_{avg}^2 - \sin^2\theta_{ext}}$$

where m is the diffraction order, $\theta$ is the incident angle of light with respect to the surface normal, $d_{hkl}$ is $$m\lambda = \frac{\sqrt{2D}}{\sqrt{(h^2 + k^2 + l^2)}}$$

where D is the macropore diameter and h, k, l are miller indices of the exposed planes, and $n_{avg}$ is the average refractive index of the photonic crystal ($n_{avg} = [\phi_{solid} n_{solid} + (1 - \phi_{solid}) n_{void}]$). The average refractive index of the photonic crystal, and hence the PBG position, $\lambda$, depend on the refractive index of the medium filling the macropores in the TiO$_2$ inverse opal.

Figure 5:
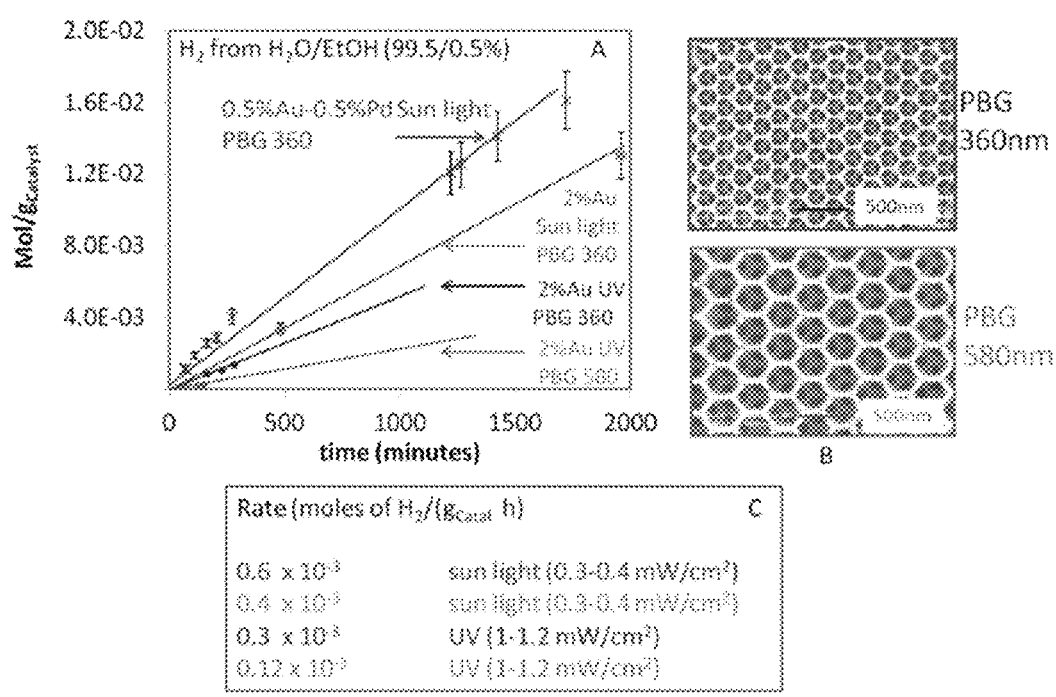
FIG. 5 (A)-(C): (A) Hydrogen production from water using photocatalysts with two different PBG positions under UV light with flux of about 1-1.2 mW/cm$^2$ and under direct sunlight with UV flux of about 0.3-0.4 mW/cm$^2$. The Au/TiO$^2$ with the PBG position close to its electronic band gap is 2 to 3 times more active than an exactly similar material in all respects (except macroporosity and PBG properties) and where the PBG is far from the electronic band gap. Under direct sunlight PBG materials are active despite the lower UV flux. The highest performance was found for the Au—Pd/TiO$_2$ PBG 360 nm. (B) SEM images of the two PBG Au/TiO$_2$ photocatalysts. Hydrogen production rates are given in (C).
Figure 6:
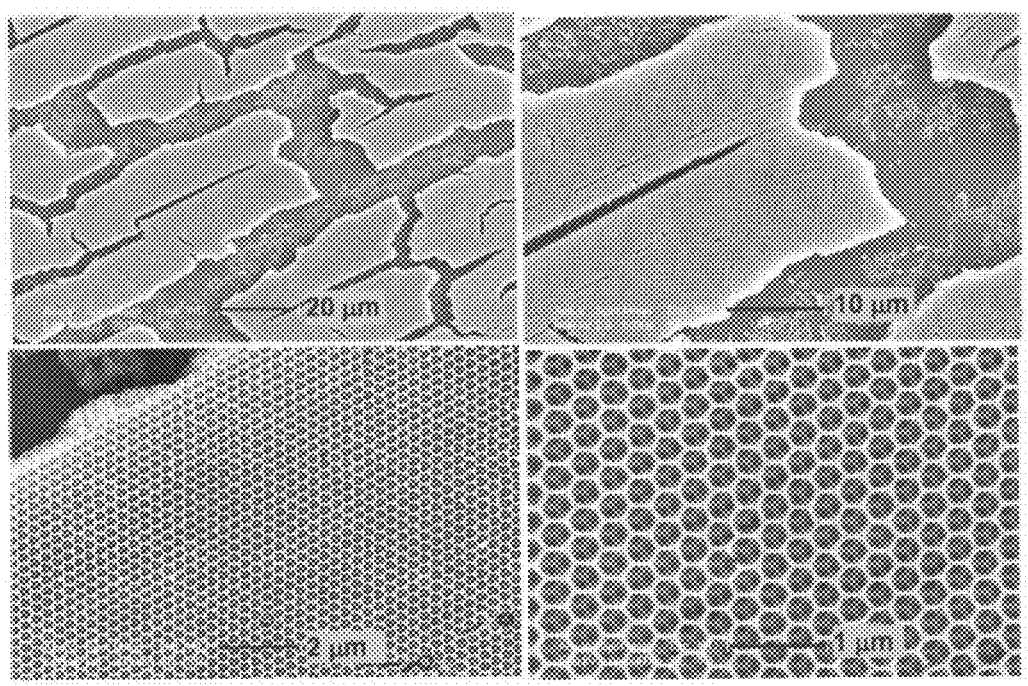
FIG. 6: SEM images of PBG 585 nm inverse opal TiO$_2$ at the indicated magnification.
Figure 7:
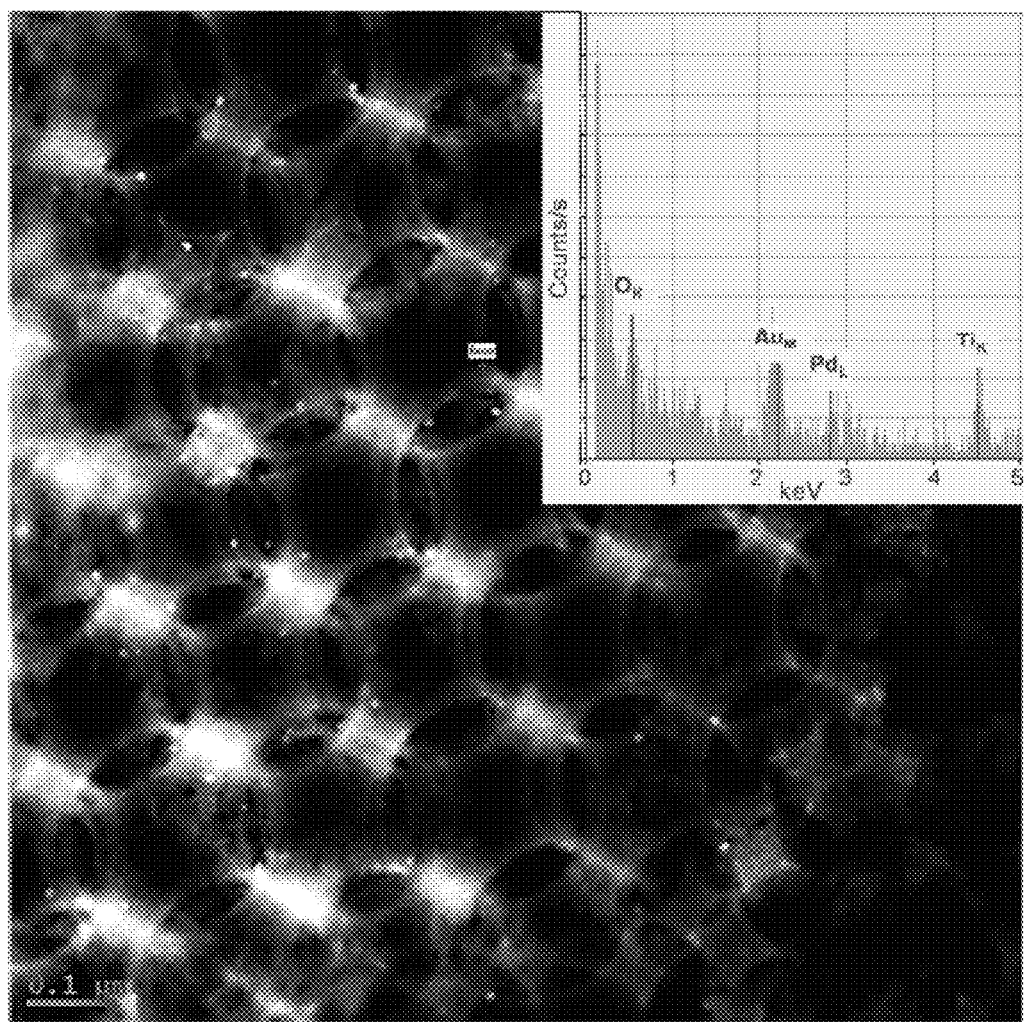
FIG. 7: Dark Field Transmission Electron Microscopy of 0.5 wt. % of Au-0.5 wt. % Pd/TiO$_2$. The bright dots are those of Au and Pd metals. Inset: EDS analysis indicating the presence of both Au and Pd.

FIG. 5 shows scanning electron microscopy (SEM) images for the Au/TiO$_2$ (PBG-357 nm) and Au/TiO$_2$ (PBG-585 nm) samples (FIG. 6 presents larger SEM images of TiO$_2$ at PBG-585 nm), and photo reaction data for water splitting to hydrogen in the presence of 0.5 vol. % of ethanol. Ethanol is used in this case as a sacrificial hole scavenger to reduce electron-hole recombination rate. It was discovered that ethylene glycol, methanol and oxalic acid could also be used successfully as sacrificial agents at concentrations as low as 0.1 vol. %. Ethanol is preferred because of its bio-renewable origin, although glycols are also attractive for this purpose as they are common industrial waste products that are often incinerated. Economic analyses indicate that the cost of sacrificial agent (at such a low %) is a fraction of the cost of the whole process. Both catalysts prepared in this study were highly active for the water splitting reaction. However, the Au/TiO$_2$ (PBG-357 nm) photocatalyst was about three times more active than the Au/TiO$_2$ (PBG-585 nm) photocatalyst. For comparison under similar conditions, 2 wt. % Au/TiO$_2$ (anatase) or 4 wt. % Au/TiO$_2$ (anatase) photo catalysts with similar particle size distributions, but not based on inverse opal TiO$_2$ supports (Murdoch, et al., 2011), gave only around one fifth of the activity of the Au/TiO$_2$ (PBG-357 nm) photocatalyst. It is believed that the difference in activity is due to the overlap between the PBG of the TiO$_2$ inverse opal support and the electronic band gap of anatase TiO$_2$ (about 380 nm). It is particularly surprising that under direct sunlight the PBG catalysts perform even better than under direct UV, even though the UV flux from the sunlight is weaker. It is worth noting that the TiO$_2$ inverse opal (alone) had negligible photo catalytic activity for H$_2$ production under UV or sunlight. The presence of a metal (or other co-catalysts) fast electron transfer and accumulation from the conduction band (CB) occurs thus further providing available sites for hydrogen ions reduction. Assays further confirmed that the amount of Au can be decreased from 2 wt. % to 0.5 wt. % when combined with 0.5 wt. % of Pd, both deposited on PBG-357 nm catalyst (see FIG. 7). The reaction rate was found to be about $0.6 \times 10^{-3}$ mol/g$_{Catal}$ h (FIG. 5) higher than that observed over the 2 wt. % Au/TiO$_2$ PBG-357 nm.

Data in FIG. 4 demonstrate that the photocatalytic properties of TiO$_2$ inverse opal based photocatalysts are strongly enhanced when the PBG and electronic absorption of TiO$_2$ are coupled. The equations above indicate that the PBG ($\lambda$) for a TiO$_2$ inverse opal is dependent on the macropore diameter (D), the Miller index of the plane from which light is being diffracted (hkl), the incident light angle and the average refractive index of the material ($n_{avg}$). The latter will vary with TiO$_2$ solid volume fraction and the medium filling the macropores. Higher index planes will have photonic band gaps at shorter wavelengths, whilst filling the macropores with water (the reactant and main H$_2$ source in this case) will increase the average refractive index of the inverse opal and red shift the PBG (FIGS. 2 and 3). The high hydrogen production rates observed for the photocatalysts prepared in this study, and in particular the Au/TiO$_2$ (PBG-357 nm) sample in sunlight, can be attributed to the fact that light from the sun changes its incident angle during the day. This allows PBGs from different planes in the TiO$_2$ inverse opal structure to overlap with the electronic absorption band of TiO$_2$ (and hence suppress spontaneous emission and electron-hole pair recombination in TiO$_2$). Another possible contributing factor is the presence of the plasmon resonance of Au particles absorbing in the visible region (FIG. 8).

A detailed analysis of the reaction products was conducted to understand the mechanisms of H$_2$ production in the current study. Traces of acetaldehyde, methane and ethylene are seen (Table 1). Next to hydrogen in production is CO$_2$ (CO was not detected).

TABLE 1

(Reaction rates under direct sunlight excitation (UV flux = 0.25-0.35 mW/cm$^2$) over 2 wt. % Au/TiO$_2$ (PBG-357 nm) photocatalyst in presence of 0.5 vol. % of ethanol)

| Product | Reaction rate in mol/(g$_{Catal}$ min) |
|---|---|
| Hydrogen | 1.5-2 × 10$^{-5}$ |
| CO$_2$ | 0.1-0.3 × 10$^{-5}$ |
| C$_2$H$_4$ | Ca. 1 × 10$^{-7}$ |
| CH$_3$CHO | Traces (0.7 × 10$^{-8}$) |
| CH$_4$ | Traces (0.4 × 10$^{-8}$) |

It is believed that the hydrogen production rate seen in Table 1 is the highest reported rate in photocatalytic systems using such a small amount of a sacrificial agent and direct sunlight. Notably, from the H$_2$ production rate and the amount of UV photons hitting the reactor it was calculated that about 80% of the UV photons were converted. In particular, FIG. 5 shows hydrogen production at about 500 minutes is ca. $5 \times 10^{-4}$ mol/g of catalyst at a UV flux close to 0.5 mW/cm$^2$ (as upper limit). The flux converted to number of photons using Plank's equation (at a wavelength average of 360 nm)=$5.5 \times 10^{14}$ photons per second hitting the area of the catalyst inside the reactor, at the maximum (catalyst amount 25 mg in 200 mL reactor). The amount of hydrogen produced per second is about $2.5 \times 10^{14}$ molecules. Since each hydrogen molecule needs two electrons to form two photons are involved. Therefore the total number of photons consumed is $5 \times 10^{14}$. Dividing the number of photons consumed by the number of photons hitting the catalyst gives about full conversion of the UV light.

Further tests were conducted to determine the stability of the Au/TiO$_2$ (PBG-357 nm over long periods of time. In particular, this photocatalyst showed consistent hydrogen production rates for periods of time up to 10,000 minutes, indicating that it may indeed prove suitable for large scale H$_2$ production.

Based on this study and previously studied reactions the following steps describe the chemical processes involved.

Step 1. Dissociative adsorption of ethanol and water occurs on the surface of TiO$_2$ in the presence or absence of light (Nadeem, et al., 2010; Jayaweera, et al., 2007):

$$CH_3CH_2OH + Ti^{4+} - O_s^{2-} \rightarrow CH_3CH_2O - Ti^{4+} + OH(a)$$

$$H_2O + Ti^{4+} - O_s^{2-} \rightarrow HO - Ti^{4+} + OH(a).$$

S for surface, (a) for adsorbed.

Step 2. Light excitation resulting in electron (e$^-$)-hole (h$^+$) pair formation:

$$TiO_2 + UV \rightarrow e^- + h^+$$

Plasmonic Au injection into the conductive band (CB) of TiO$_2$ (up to 10$^3$ electrons per 10 nm Au particle (30,000 atom) (Du, et al., 2009).

Step 3. Hole scavenging (two electrons injected per ethoxide into the valence band (VB) of TiO$_2$) followed by acetaldehyde formation (Miller, et al., 1997):

$$CH_3CH_2O - Ti_s^{4+} - O^{2-}_s + 2h^+ \rightarrow CH_3CHO(g) + OH(a) + Ti_s^{4+}.$$

Step 4. Electron transfer from the CB of TiO$_2$ to hydrogen ions (via Au nanoparticles) resulting in molecular hydrogen formation and hole transfer from one OH species (see equation b in step 1) of water:

$$4OH(a) + 4e^- + 2h^+ \rightarrow 3O_s^{2-} + \tfrac{1}{2}O_2 + 2H_2.$$

Step 5. Acetaldehyde decomposition; a slightly exothermic reaction:

$$CH_3CHO(g) \rightarrow COCH_4.$$

Step 6. Water gas shift reaction; a mildly exothermic reaction ($\Delta H = -41$ kJmol$^{-1}$):

$$CO + H_2O \rightarrow CO_2 + H_2.$$

Competing with step 5 is the coupling of two CH$_3$ radicals to C$_2$H$_6$ that is farther dehydrogenated to C$_2$H$_4$. The Photo-Kolbe process of CH$_3$COOH has been studied in some details over TiO$_2$ single crystals (Wilson & Idriss, 2003; Wilson & Idriss, 2002) and powder (Muggli & Falconer, 1999). In the process the coupling of two CH$_3$ radicals to C$_2$H$_6$ competes with the coupling of CH$_3$ with H radicals to CH$_4$.

Considering the above steps, the ratio of H$_2$ to CO$_2$ should be 2 (if water is not involved) and 3 (if one water molecule is involved, step 1b); however the H$_2$ to CO$_2$ ratio observed in all runs of this study varied between 6 and 10 depending on the reaction conditions. This indicates that large amounts of hydrogen are produced directly from water rather than simply considering the two electron injections of step 3. Hole trapping (electron injections) by ethanol occurs very fast (a fraction of a nanosecond [Sabio, et al., 2010]) while the charge carrier disappearance rate is slower (multiples of nanoseconds) in anatase TiO$_2$. The plasmonic effect of Au atoms have been observed (Linic, et al., 2011) to considerably affect electron transfer where up to 10$^3$ electrons are injected into the CB of TiO$_2$ per Au particle of about 10 nm. Also it has been reported that due to the enhancement of the electric field caused by the plasmonic excitation the rate of h$^+$ and e$^-$ generation is increased few orders of magnitudes at the interface Au—TiO$_2$. In other words the photo excited Au particles behave like nanosized concentrators amplifying the intensity of local photons (Linic, et al., 2011).

In summary, Au/TiO2 photocatalysts, based on inverse opal TiO2 supports, exhibit remarkable photocatalytic activity and stability for photocatalytic water splitting under UV and sunlight. Coincidence of the optical (PBG position) and electronic (TiO$_2$ absorption edge) properties of the TiO$_2$ inverse opal support suppresses electron-hole pair recombination in TiO$_2$, and thus enhances the photocatalytic activity of Au/TiO$_2$ photocatalysts for H$_2$ production from water. Supported gold nanoparticles act as sites for H$_2$ production and may allow visible light excitation of Au/TiO$_2$ photocatalysts via the gold surface plasmon. The Au/TiO$_2$ and Au—Pd/TiO$_2$ (PBG-357 nm) photocatalyst described in this work demonstrated a H$_2$ production rate of about 1 mol H$_2$/k$_{gcat}$. h from water (with very small amounts of sacrificial agent: ethanol 0.5 vol. %) under sunlight, and excellent operational stability.

Example 3

Anatase/Rutile Ratio and Photocatalytic Performance

A series of three-dimensional ordered macroporous (3DOM) TiO$_2$ (pure anatase) was prepared in order to study its photo-catalytic activity in the context of the present invention. These materials were prepared in the manner outlined above with respect to Example 1 and were confirmed to have overlapping electronic band and photonic band gaps. All prepared catalysts had a fixed loading of 0.50 wt. % Pd and 1.00 wt. % Au. The materials were initially made of TiO$_2$ anatase of particle size of about 10 nm.

The objective was to test the activity of these materials as prepared as well as that after heating to high temperature (prior to the bimetal deposition). The objective of heating these materials was to transform part of the anatase phase to the rutile phase and exploit their potential synergistic effect on the reaction. See Synergism and photocatalytic water splitting to hydrogen over Pt/TiO$_2$ catalysts: Effect particle size. Bashir, S. Wahab, A. K., Idriss, H. Catalysis Today. DOI: 10.1016/j.cattod.2014.05.034; Photoreaction of Au/TiO$_2$ for hydrogen production from renewables: a review on the synergistic effect between anatase and rutile phases of TiO$_2$. K. Connelly, A. K. Wahab, Hicham Idriss, Materials for Renewable and Sustainable Energy, 1:3, 1-12 (2012)).

Figure 9:
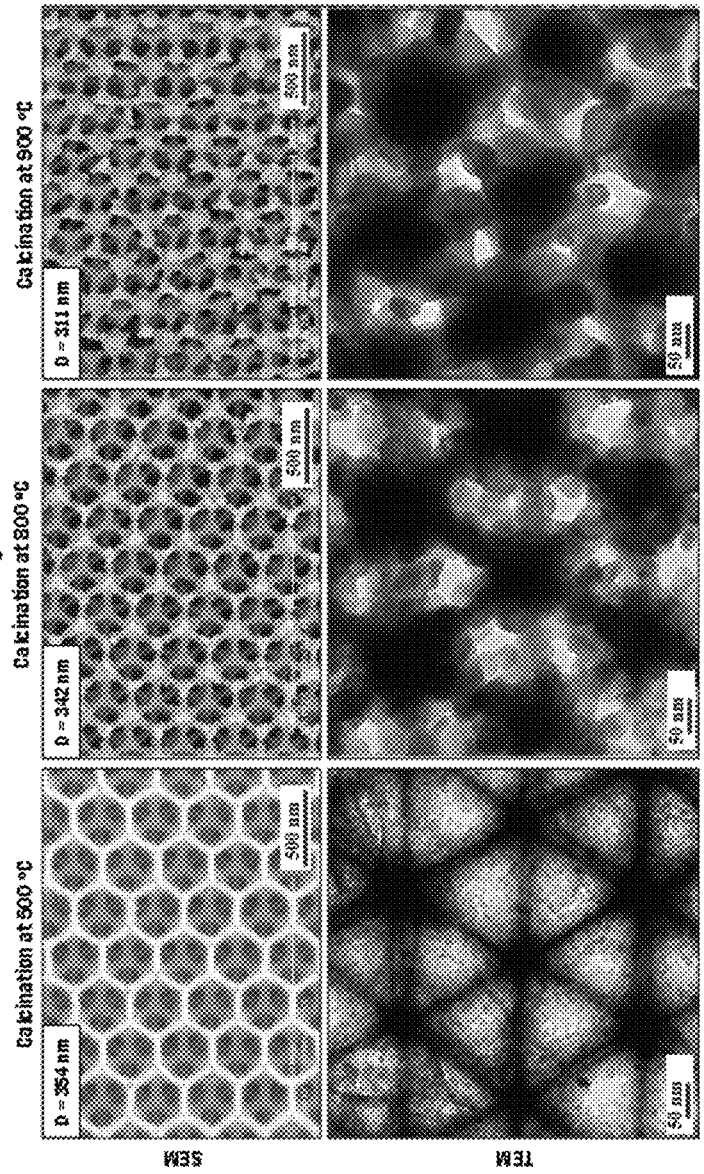
FIG. 9 Scanning electron microscopy (SEM) and transmission electron microscopy (TEM) images of TiO$_2$ photonic band gap (PBG) materials heated to different temperatures.

FIG. 9 provides data showing the 3DOM TiO$_2$ materials heated at different temperatures (500° C.; 800° C.; and 900° C.) for 2 hours in each case and then studied by scanning electron microscopy (SEM) and transmission electron microscopy (TEM). It can be seen that heat treatments resulted in increasing the cell walls (materials) and consequently decreasing the pore size. The treatment therefore resulted in blue shift of the PBG of the materials. As per the above equation relating the pore size (D) to the wavelength ($\lambda$), the decrease is the pore size (D) would decrease lambda (the photonic band gap).

Figure 10:
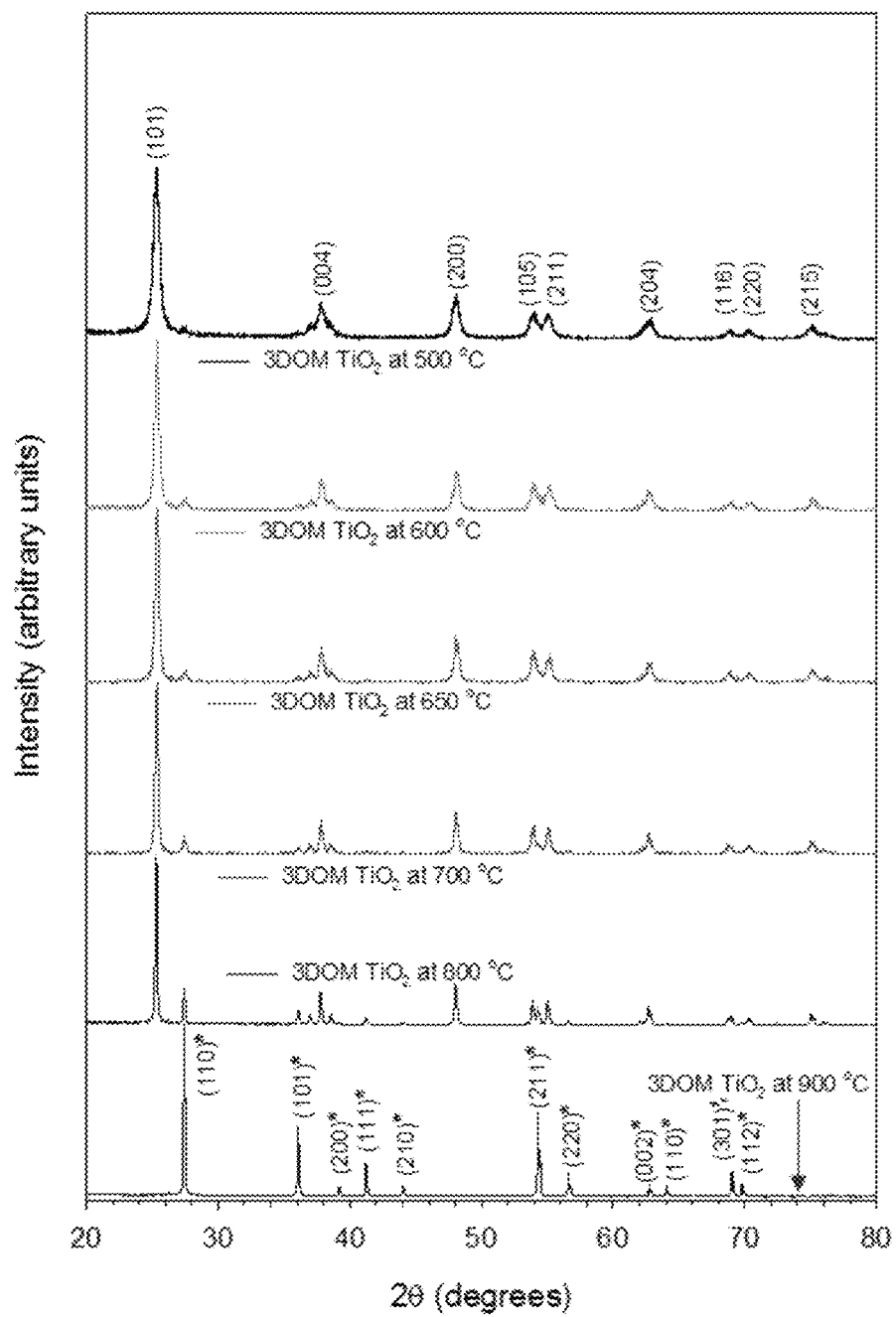
FIG. 10 XRD of the PBG TiO$_2$ materials annealed at different temperature.

FIG. 10 provides x-ray diffraction data of the 3DOM TiO$_2$ materials annealed at different temperatures. The 500° C. is composed of pure anatase phase (see the 2θ at 25.2° attributed to the (101) line of anatase and the "quasi" absence of the (110) line of the rutile at 2θ=27.4°). Upon annealing, the signal related to anatase phase decreases and that related to rutile increases with increasing temperature. Table 2 is data extracted from FIG. 10 where the % of anatase and rutile is calculated as well as the corresponding crystallite size. It is noted that the crystallite size of both phases increased with increasing temperature. This is thought be the reason behind the increase in wall thickness and the corresponding decrease in the ordered pore size which results in changing the materials.

TABLE 2

| Sample | wt. % Anatase | wt. % Rutile | Average anatase crystallite size, L (nm) | Average rutile crystallite size, L (nm) |
|---|---|---|---|---|
| 3DOM TiO$_2$ at 500° C. | 91.1 | 8.9 | 18.2 | 8.0 |
| 3DOM TiO$_2$ at 600° C. | 90.2 | 9.8 | 31.9 | 14.4 |
| 3DOM TiO$_2$ at 650° C. | 88.5 | 11.5 | 38.7 | 22.1 |
| 3DOM TiO$_2$ at 700° C. | 82.8 | 17.2 | 53.0 | 28.9 |
| 3DOM TiO$_2$ at 800° C. | 80.7 | 19.3 | 163.0 | 58.3 |
| 3DOM TiO$_2$ at 900° C. | 1.8 | 98.2 | — | 87.0 |

Figure 11:
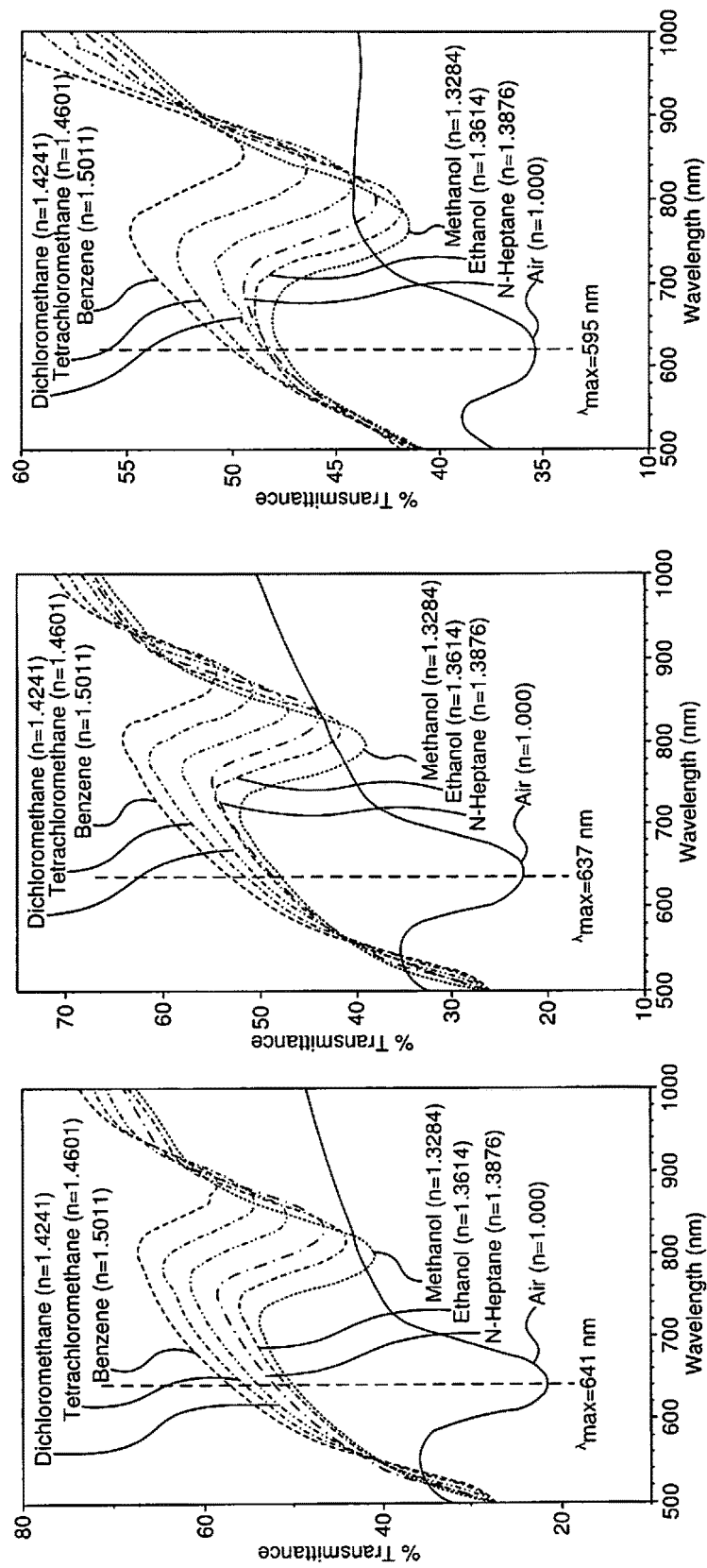
FIG. 11 UV-Vis transmittance solvent studies PBG TiO$_2$ materials.

FIG. 11 provides an example of the UV-Vis transmittance solvent studies data carried out to determine macropore sizes and solid content of 3DOM samples. Taking a regression of PBG positions vs. $n_{solvent}$, slopes and intercepts were obtained from which the dimension of the pores were extracted and compared with those calculated from SEM and TEM measurements. Table 3 provides a summary of these data. The use of different solvents changes the refractive indices of the media so the photonic band gap can be computed. The data provided are given as an example only. It is clear however that one can make the PBG coincide not only with the electronic band gap but also with the plasmonic resonance of the metal (Au) in this case (in the range 500-650 nm depending on the particle size and shape; see foe example S. Link and M. A. El-Sayed, Int. Reviews in Physical Chemistry, 2000, Vol. 19, No. 3, 409-453.)

TABLE 3

| Sample | $D_{SEM}$ (nm) | $D_{TEM}$ (nm) | $D_{solvent}$ (nm) | Exp. $\phi_{titania}$ (%) |
|---|---|---|---|---|
| 3DOM TiO$_2$ (500° C.) | 354 | 360 | 345 | 13 |
| 3DOM TiO$_2$ (800° C.) | 342 | 340 | 344 | 14 |
| 3DOM TiO$_2$ (900° C.) | 311 | 279 | 297 | 22 |

Figure 12:
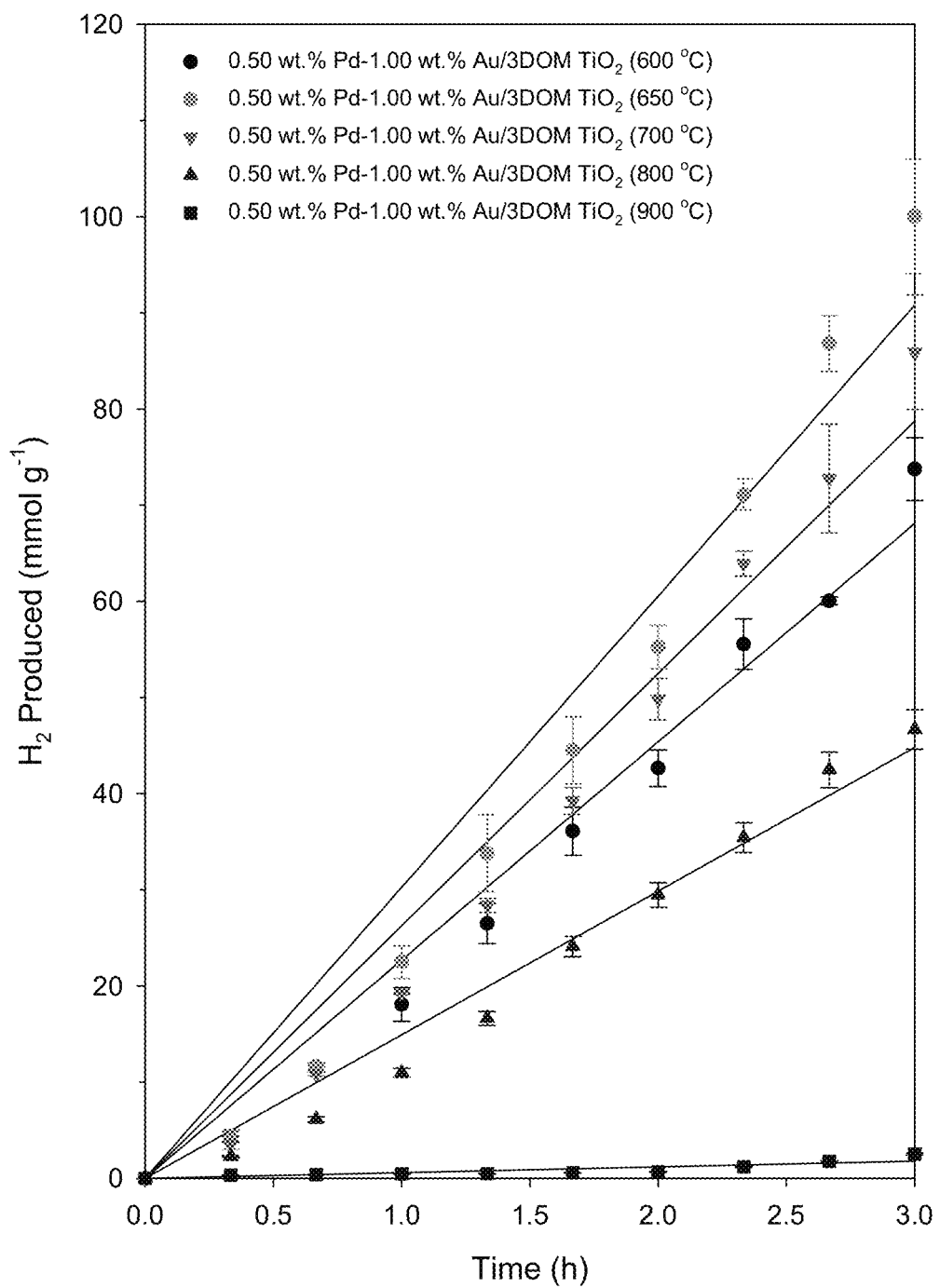
FIG. 12 Hydrogen production yield of the PBG materials annealed at the indicated temperatures (with ethanol to water volumetric ratio of 80:20).
Figure 13:
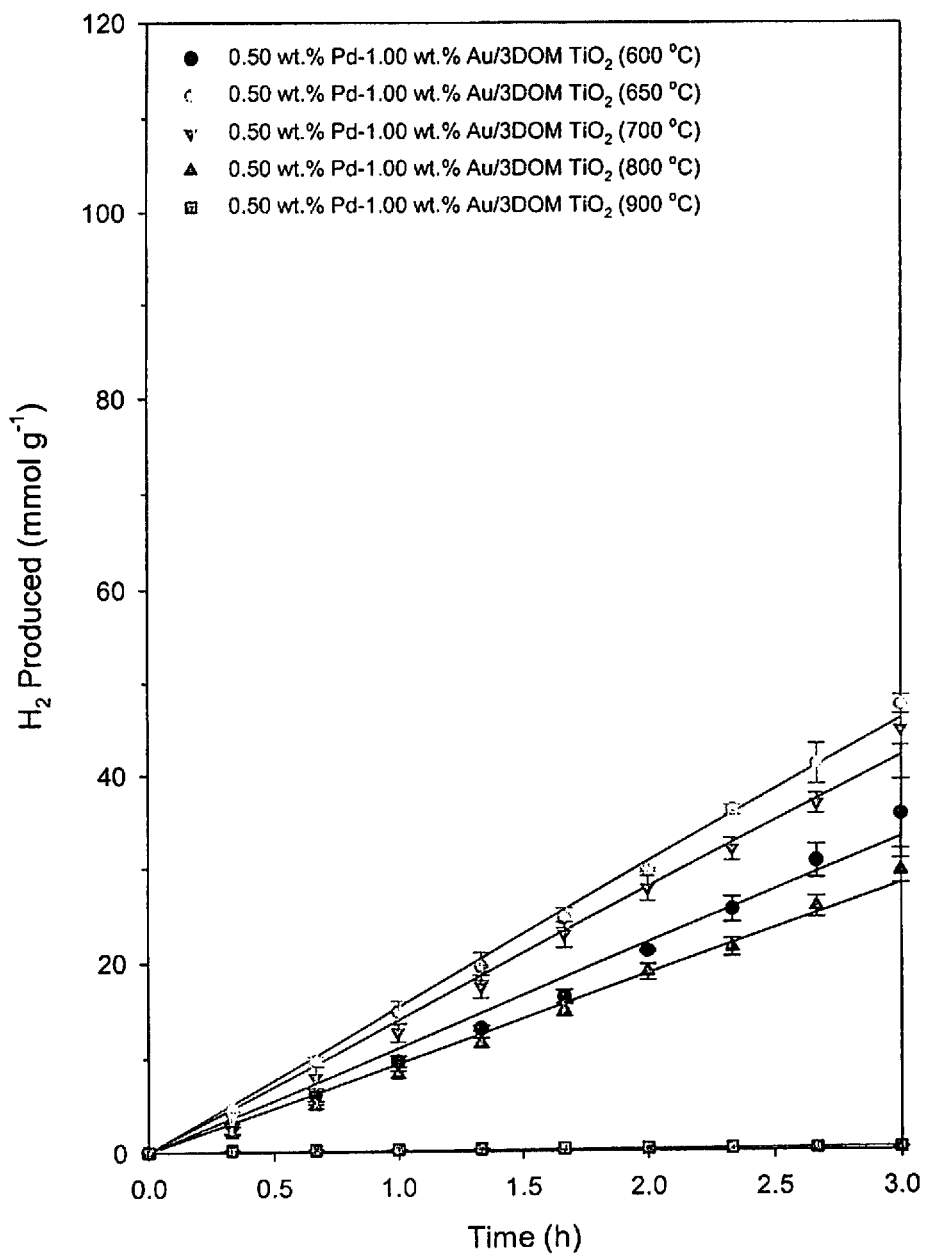
FIG. 13 Hydrogen production yield of the PBG materials annealed at the indicated temperatures (with ethanol to water volumetric ratio of 2:98).

FIGS. 12 and 13 present the hydrogen production yield of the materials annealed at the indicated temperatures but with different % of ethanol as a sacrificial agent. In FIG. 12 ethanol:water volumetric ratio is equal to 80:20, while that in FIG. 13 the ethanol:water ratio was 02:98. The dependence of the hydrogen production on the amount of sacrificial agent can change with the nature of the catalyst used, yet in general there are two maxima one organic rich and one water rich. The production and therefore the rate increased upon annealing from 600° C. to 700° C. (17% of rutile phase) then decreased again. The sample annealed at 900° C. (mainly rutile) showed negligible activity. The increase in activity was linked to the presence of both phases, anatase and rutile, with a range of about 82.8 wt. % to 90.2 wt. % anatase and 17.2 wt. % to 9.8 wt. % rutile having the highest hydrogen production rate.

REFERENCES

The following references to the extent that they provide exemplary procedural or other details supplementary to those set forth herein, are specifically incorporated by reference.

"Technoeconomic Analysis of Photoelectrochemical (PEC) Hydrogen Production, Direct Technologies under the Department of Energy (DOE) contract number: GS 10E-009J, 2009.
Chen, et al., Science. 331:746-750, 2011.
Chueh, et al. Science. 330:1797-1801, 2010.
Cushing, et. al., J Am Chem Soc. 134:15033-15041, 2012.
Du, J Phys Chem. 113:6454-6462, 2009.
Frame, et al., J Am Chem Soc. 133(19):7264-7, 2011.
Fujishima & Honda, Nature. 238:37-38, 1972.
Hanna & Nozik, J Appl Phys. 100:074510-074517, 2006.
Hou, et al., Nature Materials. 10:434-438, 2011.
Idriss & Wahab, European Patent Serial Number 12006217.9, 2012.
Jaramillo, et al., Science. 317:100-103, 2007.
Jayaweera, et al., J Phys Chem. 111:1764-1769, 2007.
Kudo & Miseki, Chem Soc Rev. 38:253-278, 2009.
Linic, et al., Nature Materials. 10:911-921, 2011.
Lu, et al., Environ Sci & Technol. 46:1724-1730, 2012.
Maeda, et al., Energy Environ Sci. 3:471-477, 2010.
Miller, et al., J Phys Chem. 101:2501-2507, 1997.
Muggli & Falconer, J Catal. 187:230-237, 1999.
Murdoch, et al. Nature Chemistry. 3:489-492, 2011.
Nadeem, et al., J PhotoChem & PhotoBio A: Chemicals. 216:250-255, 2010.
Ogden & Williams, Int J Hydrogen Energy. 15:155-169, 1990.
Ogisu, et al., Chem Lett. 36:854-855, 2007.
Sabio, et al., Langmuir. 26:7254-7267, 2010.
Sartorel, et al., Energy Environ Sci. 5:5592-5603, 2012.
Seh, et. al., Adv Mater. 24:2310-2314, 2012.
Wilson & Idriss, J Am Chem Soc. 124:11284-11285, 2002.
Wilson & Idriss, J Catal. 214:46-52, 2003.
Yablonovitch, Phys Rev Lett. 58:2059-2062, 1987.
Yamada, et al., Appl Phys Lett. 95:121112-121112-3, 2009.
Zhang, et al., Nano Lett. 13:14-20, 2013.
Zhou, et al., Langmuir. 20:1524-1526, 2004.
Zhou, et al., Langmuir. 21:4717-4723, 2005.

The invention claimed is:
1. A photocatalyst comprising:
a photoactive material comprising a photonic band gap and an electronic band gap,
wherein the photonic band gap at least partially overlaps with the electronic band gap; and
an electrically conductive material deposited on the photoactive material;
wherein the photoactive material has an inverse opal structure;
wherein the photocatalyst is in particulate form; wherein the photoactive material comprises titanium dioxide; wherein the titanium dioxide comprises a mixture of anatase and rutile; and wherein the photocatalyst is self-supported.
2. The photocatalyst of claim 1, wherein the titanium dioxide comprises at least 80 wt. % of anatase.
3. The photocatalyst of claim 2, wherein the titanium dioxide comprises about 82.8 wt. % to 90.2 wt. % anatase and 17.2 wt. % to 9.8 wt. % rutile.
4. The photocatalyst of claim 2, wherein the photonic band gap ranges from 350 nm to 420 nm and the electronic band gap ranges from 360 to 430 nm.
5. The photocatalyst of claim 1, wherein the electrically conductive material comprises a metal.
6. The photocatalyst of claim 5, wherein the metal is gold, ruthenium, rhenium, rhodium, palladium, silver, osmium, iridium, platinum, or combinations thereof.

7. The photocatalyst of claim 6, wherein the metal is gold or palladium or a combination thereof.

8. The photocatalyst of claim 7, wherein the palladium is deposited on the photoactive material and on the gold.

9. The photocatalyst of claim 1, wherein the particulate is a powdered form.

10. The photocatalyst of claim 1, wherein the electrically conductive material is a plurality of nanostructures such as nanoparticles.

11. The photocatalyst of claim 10, wherein the average particle size of the nanoparticles is from 1 to 10 nanometers.

12. The photocatalyst of claim 1, comprising 0.001 to 5 wt. % of the electrically conductive material.

13. The photocatalyst of claim 1, wherein the electrically conductive material covers between 0.001% to 5% of the total surface area of the photoactive material.

14. The photocatalyst of claim 1, wherein the photocatalyst is comprised in a composition that includes water.

15. The photocatalyst of claim 14, wherein the composition further comprises a sacrificial agent.

16. The photocatalyst of claim 15, wherein the sacrificial agent is methanol, ethanol, propanol, iso-propanol, n-butanol, iso-butanol, ethylene glycol, propylene glycol, glycerol, or oxalic acid, or any combination thereof.

17. The photocatalyst of claim 16, wherein the sacrificial agent is ethanol or ethylene glycol.

18. The photocatalyst of claim 14, wherein the composition comprises 0.1 to 5 g/L of the photocatalyst and/or 0.1 to 5 vol. % of the sacrificial agent.

19. The photocatalyst of claim 1, wherein the photocatalyst is capable of catalyzing the photocatalytic electrolysis of water.

20. The photocatalyst of claim 19, wherein the $H_2$ production rate from water is $1\times10^{-3}$ to $1\times10^{-7}$ mol/$g_{Catal}$ min.

* * * * *